US009490496B2

(12) United States Patent
Tennessen et al.

(10) Patent No.: US 9,490,496 B2
(45) Date of Patent: Nov. 8, 2016

(54) RESERVOIR FOR MULTIPHASE ELECTROLYTE FLOW CONTROL

(71) Applicant: Primus Power Corporation, Hayward, CA (US)

(72) Inventors: Peter Tennessen, Hayward, CA (US); Jonathan Hall, San Mateo, CA (US); Russell Cole, San Francisco, CA (US); Paul Kreiner, San Francisco, CA (US)

(73) Assignee: PRIMUS POWER CORPORATION, Hayward, CA (US)

( * ) Notice: Subject to any disclaimer, the term of this patent is extended or adjusted under 35 U.S.C. 154(b) by 261 days.

(21) Appl. No.: 14/196,699

(22) Filed: Mar. 4, 2014

(65) Prior Publication Data

US 2014/0255734 A1    Sep. 11, 2014

Related U.S. Application Data

(60) Provisional application No. 61/774,879, filed on Mar. 8, 2013.

(51) Int. Cl.
*H01M 8/18* (2006.01)
*H01M 8/20* (2006.01)
*H01M 12/06* (2006.01)
*H01M 8/04* (2016.01)
*H01M 8/06* (2016.01)
*H01M 2/40* (2006.01)

(52) U.S. Cl.
CPC .............. *H01M 8/20* (2013.01); *H01M 8/188* (2013.01); *H01M 12/065* (2013.01); *H01M 2/40* (2013.01); *H01M 8/04276* (2013.01); *H01M 8/0693* (2013.01); *Y02E 60/528* (2013.01)

(58) Field of Classification Search
CPC ..................................................... H01M 8/182
See application file for complete search history.

(56) References Cited

U.S. PATENT DOCUMENTS 3,644,190 A    2/1972    Weist et al.
3,713,888 A    1/1973    Symons
3,773,561 A    11/1973   Bjorkman (Continued)

FOREIGN PATENT DOCUMENTS

JP    63-314782 A    12/1988
JP    02-010671 A    1/1990

(Continued)

OTHER PUBLICATIONS

International Search Report and written opinion received in connection with international application No. PCT/US2014/020353; mailed Jun. 26, 2014.

(Continued)

*Primary Examiner* — Jacob Marks
(74) *Attorney, Agent, or Firm* — The Marbury Law Group PLLC

(57) ABSTRACT

A flow battery reservoir includes a reservoir housing, an electrolyte inlet configured to provide an electrolyte mixture containing a liquid metal-halide electrolyte solution and a complexed halogen phase at or toward a stagnant zone in a lower portion of the reservoir, and an electrolyte outlet configured to outlet the liquid metal-halide solution from the reservoir. The electrolyte outlet is positioned such that in use the liquid metal-halide solution flows upward against the force of gravity to reach the electrolyte outlet while the complexed halogen phase settles in the stagnant zone.

24 Claims, 17 Drawing Sheets

(56) References Cited

U.S. PATENT DOCUMENTS

| | | |
|---|---|---|
| 3,813,301 A | 5/1974 | Carr |
| 3,909,298 A | 9/1975 | Carr |
| 3,935,024 A | 1/1976 | Symons |
| 3,940,283 A | 2/1976 | Symons |
| 3,954,502 A | 5/1976 | Symons et al. |
| 3,993,502 A | 11/1976 | Bjorkman, Jr. |
| 4,001,036 A | 1/1977 | Berman et al. |
| 4,020,238 A | 4/1977 | Symons |
| 4,025,697 A | 5/1977 | Hart |
| 4,068,043 A | 1/1978 | Carr |
| 4,071,660 A | 1/1978 | Hart |
| 4,072,540 A | 2/1978 | Symons et al. |
| 4,086,393 A | 4/1978 | Hart |
| 4,100,332 A | 7/1978 | Carr |
| 4,115,529 A | 9/1978 | Behling |
| 4,127,701 A | 11/1978 | Symons et al. |
| 4,146,680 A | 3/1979 | Carr et al. |
| 4,162,351 A | 7/1979 | Putt et al. |
| 4,200,684 A | 4/1980 | Bro |
| 4,257,867 A | 3/1981 | Hammond et al. |
| 4,273,839 A | 6/1981 | Carr et al. |
| 4,287,267 A | 9/1981 | Whittlesey et al. |
| 4,306,003 A | 12/1981 | Henriksen |
| 4,307,159 A | 12/1981 | Hammond et al. |
| 4,320,179 A | 3/1982 | Hart |
| 4,371,825 A | 2/1983 | Chi et al. |
| 4,413,042 A | 11/1983 | Carr |
| 4,414,292 A | 11/1983 | Kiwalle et al. |
| 4,415,847 A | 11/1983 | Galloway |
| 4,482,614 A | 11/1984 | Zito, Jr. |
| 4,518,663 A | 5/1985 | Kodali et al. |
| 4,518,664 A | 5/1985 | Whittlesey et al. |
| 4,521,497 A | 6/1985 | Tamminen |
| 4,534,833 A | 8/1985 | Carr et al. |
| 4,567,120 A | 1/1986 | Jorne et al. |
| 4,678,656 A | 7/1987 | Bjorkman, Jr. et al. |
| 4,728,587 A | 3/1988 | Horie et al. |
| 4,746,585 A | 5/1988 | Stoner et al. |
| 4,766,045 A | 8/1988 | Bellows et al. |
| 4,818,642 A * | 4/1989 | Bellows .............. H01M 12/085 429/105 |
| 5,607,788 A | 3/1997 | Tomazic |
| 5,695,889 A | 12/1997 | Harbauer et al. |
| 8,450,001 B2 | 5/2013 | Kell et al. |
| 2004/0169493 A1 | 9/2004 | Tsutsui et al. |
| 2004/0234843 A1 | 11/2004 | Skyllas-Kazacos |
| 2005/0181273 A1 | 8/2005 | Deguchi et al. |
| 2005/0244707 A1 | 11/2005 | Skyllas-Kazacos |
| 2009/0239131 A1 | 9/2009 | Winter |
| 2010/0021805 A1 | 1/2010 | Winter |
| 2010/0323264 A1 | 12/2010 | Chiang et al. |
| 2011/0070468 A9 | 3/2011 | Winter |
| 2011/0223451 A1 | 9/2011 | Winter et al. |
| 2012/0052340 A1* | 3/2012 | la O' .............. H01M 12/085 429/51 |
| 2012/0282501 A1* | 11/2012 | Haynes .............. H01M 2/40 429/70 |
| 2012/0328910 A1 | 12/2012 | La O' et al. |
| 2013/0045399 A1 | 2/2013 | Cole et al. |
| 2013/0266829 A1 | 10/2013 | Cole et al. |
| 2014/0093804 A1 | 4/2014 | Kreiner et al. |

FOREIGN PATENT DOCUMENTS

| | | |
|---|---|---|
| JP | 07-065871 A | 3/1995 |
| JP | 07-153478 A | 6/1995 |
| JP | 2001-216995 A | 8/2001 |
| JP | 2008-078078 A | 4/2008 |
| WO | WO2008/089205 A2 | 7/2008 |
| WO | WO2011/011533 A2 | 1/2011 |

OTHER PUBLICATIONS

U.S. Appl. No. 14/230,813, filed Mar. 31, 2014, Primus Power Corporation.

Symons, Philip C., "Advanced Technology Zinc/Chlorine Batteries for Electric Utility Load Leveling," 19th Intersociety Energy Conversion Engineering Conf., 1984, vol. 2, 857-862.

EPRI Report, EM-1051 (parts 1-3), Apr. 1979, Electric Power Research Institute.

International Preliminary Report on Patentability received in connection with international application No. PCT/US2012/043805; mailed Jan. 16, 2014.

International Search Report & Written Opinion issued in PCT Application No. PCT/US2012/043805, mailed on Jan. 23, 2013.

International Search Report received in connection with international application No. PCT/US2013/031952; mailed Jun. 28, 2013.

ACS Industries LP, "Liquid-Liquid Coalescer Design Manual," published Sep. 2013, 18pgs.

\* cited by examiner

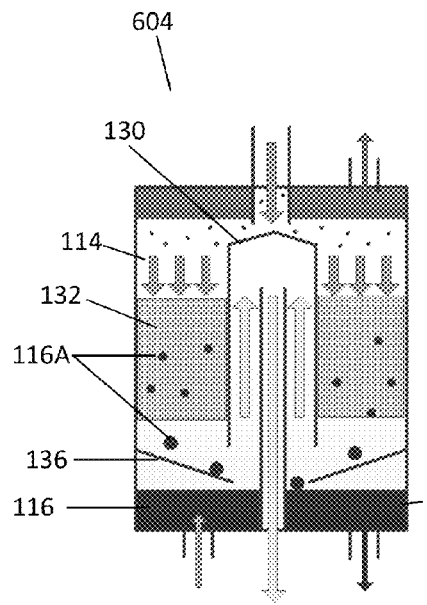
Fig. 6
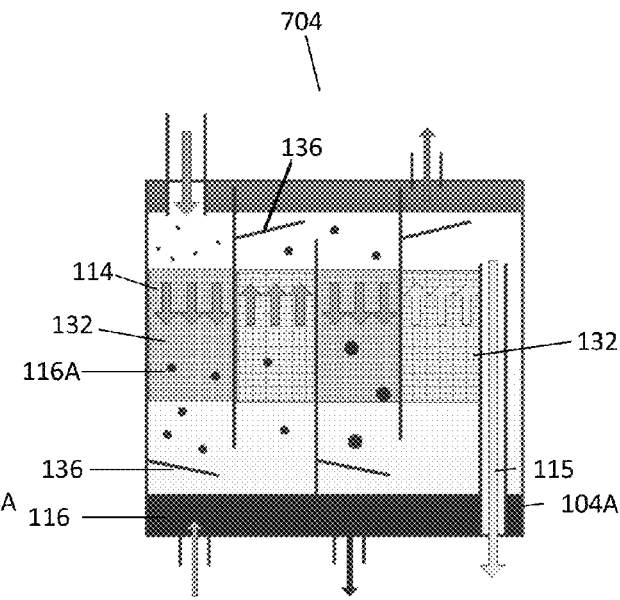
Fig. 7
Fig. 10
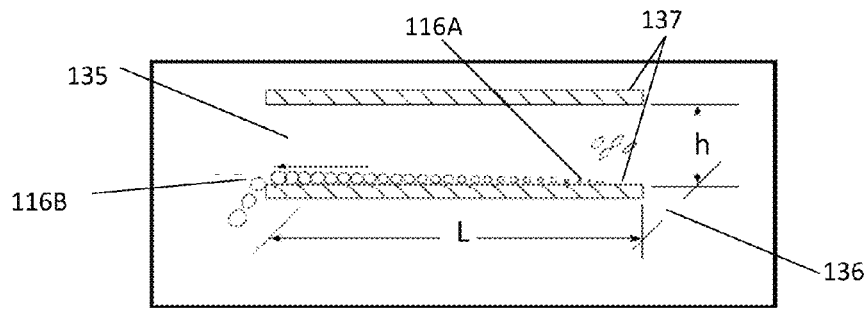
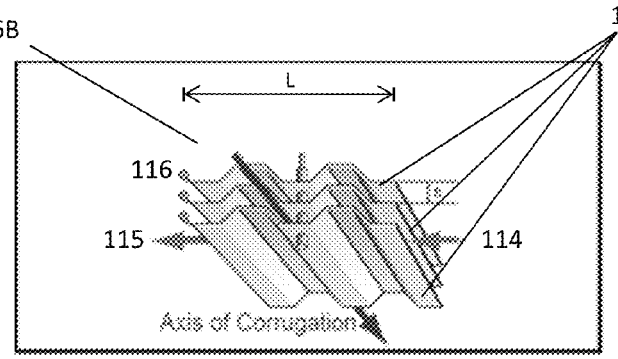
Fig. 11

RESERVOIR FOR MULTIPHASE ELECTROLYTE FLOW CONTROL

CROSS REFERENCE TO RELATED APPLICATION

This application claims the benefit of priority to U.S. Provisional Patent Application Ser. No.: 61/774,879 entitled "Reservoir for Multiphase Electrolyte Flow Control" filed Mar. 8, 2013, which is incorporated herein by reference in its entirety.

FIELD

The present invention is directed to electrochemical systems and methods of using same.

BACKGROUND

The development of renewable energy sources has revitalized the need for large-scale batteries for off-peak energy storage. The requirements for such an application differ from those of other types of rechargeable batteries such as lead-acid batteries. Batteries for off-peak energy storage in the power grid generally are required to be of low capital cost, long cycle life, high efficiency, and low maintenance.

One type of electrochemical energy system suitable for such an energy storage is a so-called "flow battery" which uses a halogen component for reduction at a normally positive electrode in discharge mode, and an oxidizable metal adapted to become oxidized at a normally negative electrode during the normal operation of the electrochemical system. An aqueous metal halide electrolyte is used to replenish the supply of halogen component as it becomes reduced at the positive electrode. The electrolyte is circulated between the electrode area and a reservoir area. One example of such a system uses zinc as the metal and chlorine as the halogen.

Such electrochemical energy systems are described in, for example, U.S. Pat. Nos. 3,713,888, 3,993,502, 4,001,036, 4,072,540, 4,146,680, and 4,414,292, the disclosures of which are hereby incorporated by reference in their entirety.

SUMMARY

An embodiment relates to a flow battery reservoir, comprising a reservoir housing, an electrolyte inlet configured to provide an electrolyte mixture comprising a liquid metal-halide electrolyte solution and a complexed halogen phase at or toward a stagnant zone in a lower portion of the reservoir, and an electrolyte outlet configured to outlet the liquid metal-halide solution from the reservoir. The electrolyte outlet is positioned such that in use the liquid metal-halide solution flows upward against the force of gravity to reach the electrolyte outlet while the complexed halogen phase settles in the stagnant zone.

Another embodiment relates to a method of operating a flow battery, comprising providing an electrolyte mixture comprising a liquid metal-halide electrolyte solution and a complexed halogen phase from a flow battery stack at or toward a stagnant zone in a lower portion of a reservoir, and providing the liquid metal-halide solution from the reservoir to the flow battery stack such that the liquid metal-halide solution flows upward against the force of gravity in the reservoir while the complexed halogen phase settles in the stagnant zone.

Another embodiment relates to a flow battery system, comprising a stack of flow battery cells, a complexed halogen phase reservoir, a liquid metal-halide electrolyte solution reservoir, and a chamber comprising one or more coalescing filters and one more or more settlers located in a flow path between the stack of electrochemical cells and the reservoirs. A liquid metal-halide electrolyte solution exiting the chamber is directed to the liquid metal-halide electrolyte solution reservoir and a complexed halogen phase exiting the chamber is directed to the complexed halogen phase reservoir.

Another embodiment relates to a flow battery system, comprising a stack of flow battery cells, a first stack outlet comprising complexed halogen phase poor electrolyte outlet in the stack, and a second stack outlet comprising complexed halogen phase rich electrolyte outlet in the stack. The system also includes a reservoir comprising a reservoir housing, a first electrolyte inlet located in a lower portion of the reservoir, and a second electrolyte inlet located in the lower portion of the reservoir, a first diffuser fluidly connected to the first electrolyte inlet and a second diffuser fluidly connected to the second electrolyte inlet. A first outlet conduit is fluidly connected the first stack outlet to the first electrolyte inlet of the reservoir, and a second is outlet conduit fluidly connected the second stack outlet to the second electrolyte inlet of the reservoir.

BRIEF DESCRIPTION OF THE DRAWINGS

FIGS. 1A, 1B, 1D, 2-4, 6-9, 12-16, 17A, 17C, 18, 19A, 20, 21, 22 and 23 illustrate side cross sectional views of devices of various embodiments of the invention.

FIGS. 10 and 11 are schematic illustrations of settlers.

DETAILED DESCRIPTION

Figure 1A:
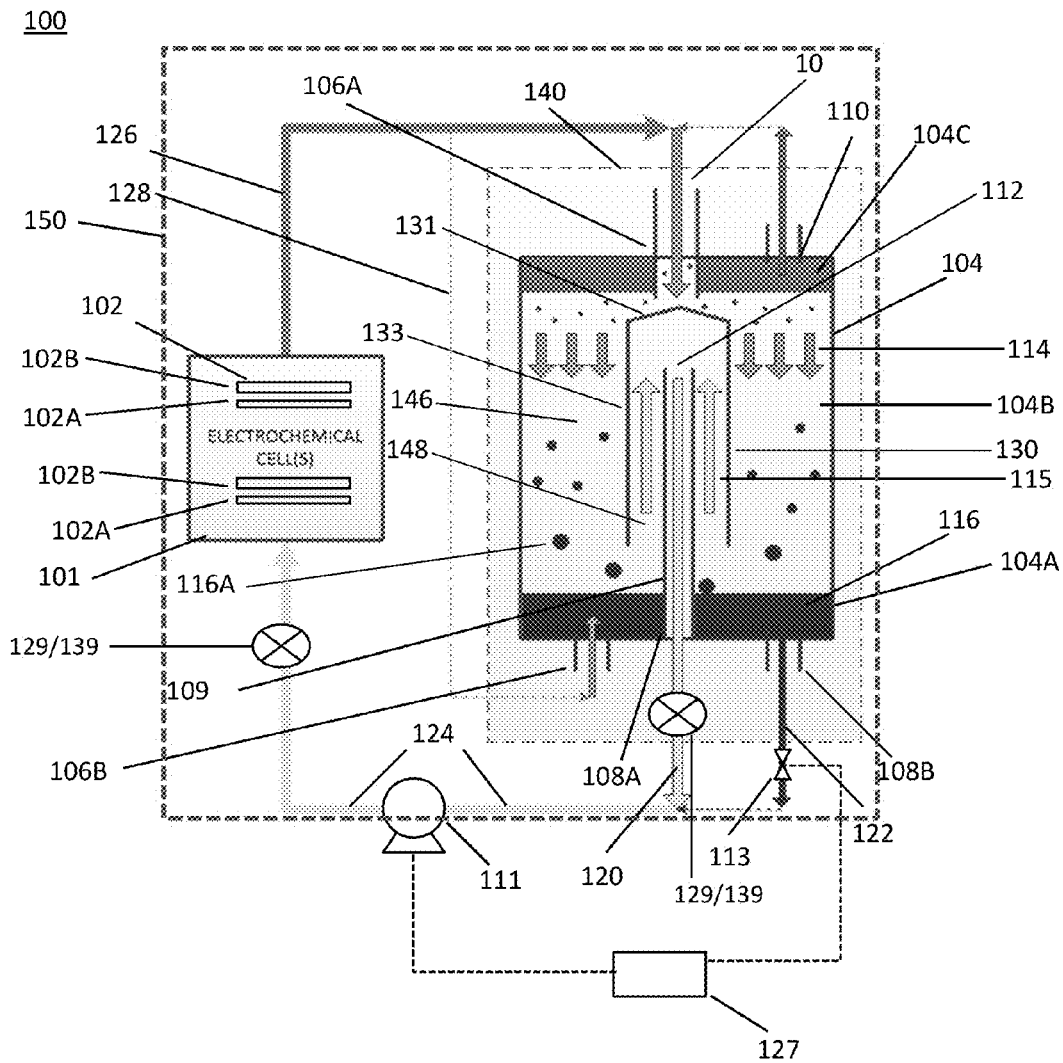

Embodiments of the present invention are drawn to metal-halogen flow battery systems and methods of using these systems. Embodiments of the method include operating a flow battery by providing an electrolyte mixture having a liquid metal-halide electrolyte solution and a complexed halogen phase from a flow battery stack at or toward a stagnant zone at a bottom of a reservoir housing and providing the liquid metal-halide solution from the reservoir housing to the flow battery stack such that the liquid metal-halide solution flows upward against the flow of gravity in the reservoir housing while the complexed halogen phase settles in the stagnant zone. Embodiments of the system discussed in more detail below include one or more reservoirs configured to implement the methods.

Embodiments of the systems include a flow architecture with a single flow circuit. Conventional metal halogen flow batteries maintain electrochemical efficiency by keeping reactant streams contained in two distinct flow loops by using a separator between the positive and negative electrodes of each flow cell and separate reservoirs for the electrolyte and the halogen reactant. The configurations below describe systems and methods for reactant handling that combine the simplicity and reliability of a single flow loop system with reactant separation balance of plant (BOP) components. Preferably, the single flow loop system includes a stack of flow battery cells without a separator between the positive and negative electrodes of each flow cell (i.e., the reaction zone is not partitioned) and a common reservoir for the electrolyte and the concentrated (e.g., complexed) halogen reactant.

The electrochemical (e.g., flow battery) system can include a vessel containing one or more electrochemical cells (e.g., a stack of flow battery cells) in its inner volume, a metal-halide electrolyte, an electrolyte reservoir and a flow circuit configured to deliver the metal-halide electrolyte to the electrochemical cell(s). The flow circuit may be a closed loop circuit that uses a pump to deliver the electrolyte between the reservoir and the cell(s). In many embodiments, the loop circuit may be a sealed loop circuit.

Each of the electrochemical cell(s) may comprise a first, fluid permeable electrode, which may serve as a positive electrode, a second, fluid impermeable electrode, which may serve as a negative electrode, and a reaction zone between the electrodes. In certain embodiments, the first electrode may be a porous electrode or contain at least one porous element. For example, the first electrode may comprise a porous or a permeable metal electrode, such as ruthenium or iridium coated titanium or tantalum, such as ruthenium oxide coated titanium. In a discharge mode, the first electrode may serve as a positive electrode, at which the halogen may be reduced into halogen ions. The use of the porous material in the first electrode may increase efficiency of the halogen reactant's reduction. The second electrode may comprise a metal, such as titanium or ruthenized titanium (i.e., ruthenium coated titanium, where the ruthenium is oxidized to form ruthenium oxide) that is plated with zinc. Alternatively, the second electrode may comprise carbon or carbon impregnated plastic.

Preferably, the reaction zone lacks a separator and the electrolyte circulates through the same flow path (e.g., single loop) without a separation between the electrodes in each cell. In other words, the reaction zone may be such that it does not contain a membrane or a separator between the positive and negative electrodes of the same cell that is impermeable to the halogen ions in the electrolyte. Furthermore, the cell may be a hybrid flow battery cell rather than a redox flow battery cell. Thus, in the hybrid flow battery cell, a metal, such as zinc is plated onto one of the electrodes, the reaction zone lacks an ion exchange membrane which allows ions to pass through it (i.e., there is no ion exchange membrane between the cathode and anode electrodes) and the electrolyte is not separated into a catholyte and anolyte by the ion exchange membrane. The electrolyte is stored in one reservoir rather than in separate catholyte and anolyte reservoirs.

Preferably, the electrochemical system may be reversible, i.e., capable of working in both charge and discharge operation mode. The reversible electrochemical system usually utilizes at least one metal halide in the electrolyte, such that the metal of the metal halide is sufficiently strong and stable in its reduced form to be able to form an electrode. The metal halides that can be used in the reversible system include zinc halides, as element zinc is sufficiently stable to be able to form an electrode. Preferably, the electrolyte is aqueous solution of at least one metal halide electrolyte compound, such as $ZnBr_2$ and/or $ZnCl_2$. For example, the solution may be a 15-50% aqueous solution of $ZnBr_2$ and/or $ZnCl_2$, such as a 25% solution. In certain embodiments, the electrolyte may contain one or more additives, which can enhance the electrical conductivity of the electrolytic solution. When the electrolyte contains $ZnBr_2$, then the electrolyte may also contain a bromine complexing agent, such as such as a quaternary ammonium bromide (QBr), such as N-ethyl-N-methyl-morpholinium bromide (MEM), N-ethyl-N-methyl-pyrrolidinium bromide (MEP) or Tetra-butyl ammonium bromide (TBA).

FIG. 1A illustrates an electrochemical system 100 according to an embodiment. This embodiment includes one or more electrochemical cells 102, such as a stack 101 of cells 102. The stack may be a vertical stack of horizontal cells for example. Each cell 102 contains a positive, permeable electrode 102A and a negative, impermeable electrode 102B. The stack 101 is fluidly connected to a vertically oriented reservoir 104 (i.e., a reservoir housing comprising a tank or another suitable liquid container shape). In an embodiment, the reservoir 104 includes three portions: a lower portion 104A (e.g., stagnant zone), a middle portion 104B and an upper portion 104C. A complexed halogen phase, such as a bromine complexed with a complexing agent (such as a quaternary ammonium bromide (QBr), such as N-ethyl-N-methyl-morpholinium bromide (MEM), N-ethyl-N-methyl-pyrrolidinium bromide (MEP) or Tetra-butyl ammonium bromide (TBA)) is stored in the lower portion 104A (e.g., the stagnant zone) of the reservoir 104. The lower portion 104A may also contain some of the aqueous halogen electrolyte in addition to the complexed halogen phase. The middle portion 104B includes the aqueous halogen electrolyte (e.g., $ZnCl_2$ and/or $ZnBr_2$ liquid metal-halide electrolyte solution) with little or no complexing agent. Gaseous species, such as air bubbles, halogen (e.g. $Cl_2$ or $Br_2$) and hydrogen gas are stored in the upper portion 104C (e.g., head space) of the reservoir 104.

There are no specific limits on height of the portions 104A, 104B and 104C, except that region 104B is located between regions 104A and 104C. For example, portion 104A may comprise 2-20%, such as 5-10% of the volume of the reservoir, portion 104C may comprises 0.1-3%, such as 0.5 to 1% of the volume of the reservoir and portion 104B comprises the majority remainder (e.g., 77 to 98%, such as 90-95%) of the volume of the reservoir 104. In general, the electrolyte flow returning from the stack 101 to the reservoir 104 via conduit 126 is a homogenized and thoroughly mixed flow that can include up to three phases: the liquid electrolyte solution which comprises the majority of the volume, a higher density liquid which consists of complexed halogen and which comprises a small fraction, approximately 5-10% by volume, and optionally a gas mixture which is either entrained in the flow or produced as a byproduct of the electrochemical reaction and which comprises a very small fraction, generally less than 1%, by volume. The phases of the mixed flow are separated into reservoir 104 portions 104B, 104A and 104C, respectively, as will be described in more detail below.

Preferably, but not necessarily, the entire electrochemical system 100 which contains the stack 101 of cells 102 and the reservoir 104 subsystem 140 is located in the same housing 150. However, the stack 101 and the subsystem 140 may be located in separate housings if desired.

In an embodiment, the reservoir 104 includes a primary inlet 106A through which mixture 114 of liquid metal-halide electrolyte solution 115 and complexed halogen phase 116 is received from the stack 101 of electrochemical cells 102 via conduit 126. In the embodiment of FIG. 1, the primary inlet 106A is located above the stagnant zone 104A of the reservoir 104, such as in the middle portion 104B and/or in the upper portion 104C. The inlet 106A may comprises one or more openings located in the top wall of the reservoir 104 and/or in the sidewall(s) of the reservoir.

Also included in the upper portion 104C of the reservoir 104 is a gas outlet 110. Gas located in the upper portion (or head space) 104C can be removed from the reservoir 104 via the gas outlet 110. If desired all or a portion of the gas removed from the reservoir 110 can be recirculated into the conduit 126.

The reservoir 104 may also include an optional secondary inlet 106B. In an embodiment, the secondary inlet 106B may be located in the lower portion 104A of the reservoir 104. Optionally, some of the heavier complexed halogen phase 116 of the electrolyte mixture 114 from the stack 101 of electrochemical cells 102 may be separated from the bulk of the electrolyte mixture 114 by flowing through the porous electrodes 102A in the stack 101. The complexed phase 116 (which may also contain some electrolyte solution 115) is delivered to the lower portion 104A of the reservoir 104 via optional conduit 128 and the secondary inlet 106B. The inlet 106B may comprise one or more openings located in the bottom wall and/or the sidewall(s) of the reservoir 104 in the stagnant zone 104A.

Thus, the secondary inlet 106B allows a fraction of the flow mixture 114 or the complexed halogen phase 116 to pass through the stagnant zone 104A and access the complexing agent located in the stagnant zone 104A more readily. If diffusion of halogen and complexing agent are relatively slow, this configuration can improve mixing of the two significantly compared to relying on mixture 114 flowing past the top of the stagnant zone 104A. Of course, the fluid flow rate into this secondary inlet 106B should be managed appropriately since it does not pass through the coalescing regions of the reservoir and may not separate as well as the primary flow. For this reason, it may be advantageous to actively control the fraction of the flow that comes in through the secondary inlet 106B using a flow control device, such as a valve, etc. (not shown), in response to charge/discharge cycles, temperature, concentration of halogen, etc.

The reservoir 104 also includes a primary outlet 108A through which electrolyte 115 can be provided back to the stack of electrochemical cells 102. In the embodiment of FIG. 1, the primary outlet 108A is located in a middle of the lower portion 104A of the reservoir 104 (e.g., an opening in the bottom wall of the reservoir). However, the outlet 108A may be located in other locations (e.g. an opening in the sidewall(s) of the reservoir, as will be described below).

In an embodiment, the primary outlet 108A is connected to a conduit 109 that extends from outlet 108A in the lower portion 104A of the reservoir 104, through the lower portion 104A of the reservoir 104 into the middle portion 104B of the reservoir 104. The inlet of the conduit 112 is located in the middle portion 104B of the reservoir. The conduit 109 may be a pipe or manifold that has an opening (i.e., inlet 112) at the upper end thereof and no openings in the lower end thereof in portion 104A other than that connected to the primary outlet 108A of the reservoir.

With this configuration, liquid metal-halide electrolyte solution 115 can be removed from the middle portion 104B of the reservoir 104, then passed through conduit 109 and outlet 108A and finally provided to the stack 101 of electrochemical cells 102 via conduits 120 and 124 without the inclusion of excess complexed halogen phase 116 from the lower portion 104A of the reservoir 104.

If additional complexed halogen phase 116 is desired in the stack 101, a secondary outlet 108B operatively connected to the lower portion 104A of the reservoir may be provided. Complexed halogen phase 116 may be provided from the lower portion 104A of the reservoir 104 through the secondary outlet 108B and associated conduit 122 and mixed with the liquid metal-halide electrolyte solution 115 provided from the primary outlet 108A through conduit 120 in outlet conduit 124. One or more pumps 111 connected to the outlet conduit 124 may be used to provide electrolyte 115 and/or complexed halogen phase 116 between the reservoir 104 and the stack 101 of electrochemical cells 102. Additionally, one or more valves 113 in conduit 122 may be used to control the amount of complexed phase 116 provided from the reservoir 104 to the stack 101 of electrochemical cells 102.

Preferably, in charge mode, the single pump 111 is used in a single flow loop 120-124-126 to pump metal-halide electrolyte solution 115 from the reservoir middle portion 104B to the stack 101 and then from the stack back to the reservoir 104, while the valve 113 in conduit 122 is closed to minimize providing the complexed halogen phase from reaching the stack 101. In discharge mode, the valve 113 is opened and the single pump 111 is used in a single flow loop 120-122-124-126 to pump the liquid metal-halide electrolyte solution 115 and the complexed halogen phase 116 from the reservoir to the stack 101 and back to the reservoir 104.

The one or more pumps 111 and the one or more valves 113 may be controlled with a control system 127, such as a personal computer or other dedicated control logic chip or device. The temperature of the electrolyte in the stack 101 and/or in the reservoir 104 may be measured using a temperature sensor 129, such as a thermocouple, and adjusted by changing a setting of a temperature control device which may comprise the control system 127. The temperature may be adjusted, for example, with a heater or a heat exchanger 139 shown schematically in FIG. 1A. For example, the heat exchanger 139 may comprise a coil shaped cooling/heating conduit wrapped around one or more of the conduits 109, 120, 122, 124, 125 (described below with respect to FIGS. 1D and 17D), 126, 128 of the electrochemical system 100. The cooling/heating conduit may comprise a pipe with a heat exchange fluid, such as ethylene glycol or silicone fluid, which is wrapped around system conduits 109, 120, 122, 124, 125, 126 and/or 128. Other heat exchangers, such as plate type heat exchangers or coaxial pipe heat exchangers (e.g., with the heat exchanger pipe located coaxially inside or outside the system conduits (e.g., pipes) 109, 120, 122, 124, 125, 126 and/or 128. Alternatively, the heater may comprise a resistive heating coil or another heating element. The temperature sensor(s) 129 may be located within the stack 101 and/or the reservoir 104 or located adjacent the conduits 120 or 124 as illustrated in FIG. 1A.

Embodiments include one more internal structures, such as baffles 130 in the reservoir 104 to aid in separating the complexed halogen phase 116 from the liquid metal-halide electrolyte solution 115. In first an embodiment, the reservoir includes a baffle 130 located centrally inside the reservoir 104 around outlet conduit 109 as illustrated in FIG. 1. The reservoir 104 may be generally cylindrical in shape (e.g., having a circular horizontal cross-section). However, other shapes may also be used (e.g., square, rectangular or other polygonal horizontal cross section). In this embodiment, the baffle 130 may be generally cylindrical in shape with a generally cone shaped top portion 131. That is, the baffle 130 includes a substantially cylindrical sidewall portion 133 (e.g., exactly cylindrical or deviating slightly from a circular horizontal cross section) axially aligned with the longitudinal axis of the reservoir 104 and a top portion 131 covering the cylindrical sidewall portion 133. Fluid mixture 114 entering the reservoir 104 through the primary inlet 106A in a downward direction 10 impinges on the top portion 131 of the baffle 130 and is redirected in a non-parallel direction (e.g., perpendicular direction) to the original downward flow direction 10. That is, the incoming electrolyte mixture 114 changes direction from a downward vertical direction 10 to a substantially annular (i.e., outwardly radial) direction.

The complexed halogen phase 116 is typically denser than the liquid metal-halide electrolyte solution 115 and settles in lower portion 104A of the reservoir 104. Thus, droplets 116A of complexed halogen phase 116 entrained in the non-complexed aqueous electrolyte solution 115 will sink to the lower portion 104A of the reservoir 104 around the periphery of the reservoir 104 as the electrolyte mixture 114 flows in an outer annular passage 146 between the sidewall portion 133 of the baffle 130 and the sidewall of the reservoir 104.

The baffle 130 is configured such that the lower edge of the sidewall portion 133 of the baffle 130 is located in the middle portion 104B of the reservoir 104. In this manner, the liquid metal-halide electrolyte solution 115 may flow up in an inner annular passage 148 between the inner sidewall portion 133 of the baffle 130 and the outer wall of the outlet conduit 109. When the liquid metal-halide electrolyte solution 115 reaches the top of outlet conduit 109, it enters the outlet conduit 109 via the inlet opening 112. The liquid metal-halide electrolyte solution 115 may then flow down the outlet conduit 109 and exit the reservoir 104 via the primary outlet 108A in the bottom wall of the reservoir 104.

The majority of the complexed halogen phase 116 is settled in the stagnant zone 104A and does not reach the inlet opening 112 of conduit 109 located in reservoir portion 104B. The baffle 130 blocks the complex halogen phase 116 containing mixture 114 from flowing directly from inlet 108B into the inlet opening 112 of conduit 109.

Thus, the reservoir 104 passively separates the three phases of the mixed flow (i.e., electrolyte mixture) 114 so that denser liquid settles into a stagnant zone 104A at the bottom, the less dense liquid is pumped out from the middle portion 104B through the reservoir's main outlet 108A, and the gas bubbles escape the flow to the head space 104C in the reservoir. The separation does not add significant pressure drop to the flow through the reservoir and does not impede bulk mixing or turnover of the liquid in the reservoir.

In the embodiment of FIG. 1A, the separation is achieved by an annular flow design where the mixed flow 114 enters the reservoir at the top and is directed to an outer annulus by the cylindrical baffle 130. As the mixed flow travels uniformly downwards, dispersed droplets of the denser liquid 116 coalesce into larger droplets which tend to accelerate towards the bottom 104A of the reservoir. Similarly, dispersed air bubbles coalesce into larger ones which float towards the top 104C of the reservoir. Near the bottom of the reservoir, the lighter electrolyte 115 flow turns and travels upwards through an inner annulus 148 between the conduit 109 and the baffle 130 sidewall 133. This change of flow direction encourages the droplets of denser liquid 116 to fall out of the flow 115 and settle in the bottom 104A of the reservoir. It also ensures that a certain volume at the bottom 104A of the reservoir is largely stagnant and not picked up by the suction at the reservoir's primary outlet 108A. Therefore, the majority of the flow coming through the primary outlet 108A will be the electrolyte solution 115.

The volume fraction of the stagnant zone 104A can be changed by a selecting or changing the baffle geometry. In one embodiment, the volume fraction of the stagnant zone 104A can be dynamically adjusted to match the volume of denser liquid (i.e., the complexed halogen phase) 116. Dynamic adjustment would ensure that the stagnant zone 104A volume is never too small (which would prevent all of the denser liquid 116 from settling out) or too large (which would leave some electrolyte 115 in the stagnant zone 104A). Dynamic adjustment could be active and achieved using the control system 127 to vertically move (i.e., move up and down) the baffle 130. Alternatively, dynamic adjustment may be passive and achieved by placing a floating annular, horizontal separation plate in the reservoir with a tuned density such that it always floats at the interface between the two liquid phases 115, 116 (i.e., at the variable interface between reservoir portions 104A and 104B).

Figure 13:
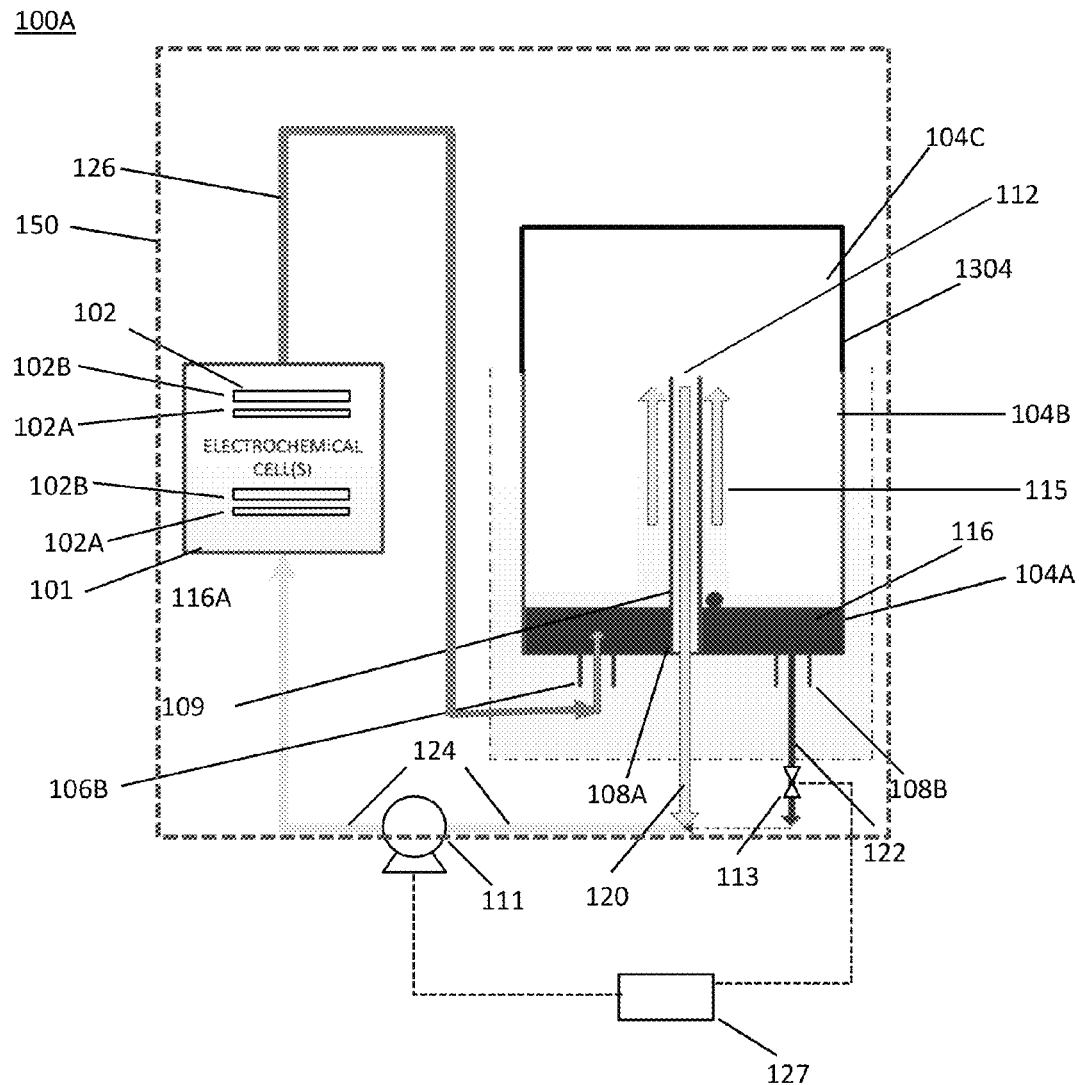
Figure 14:
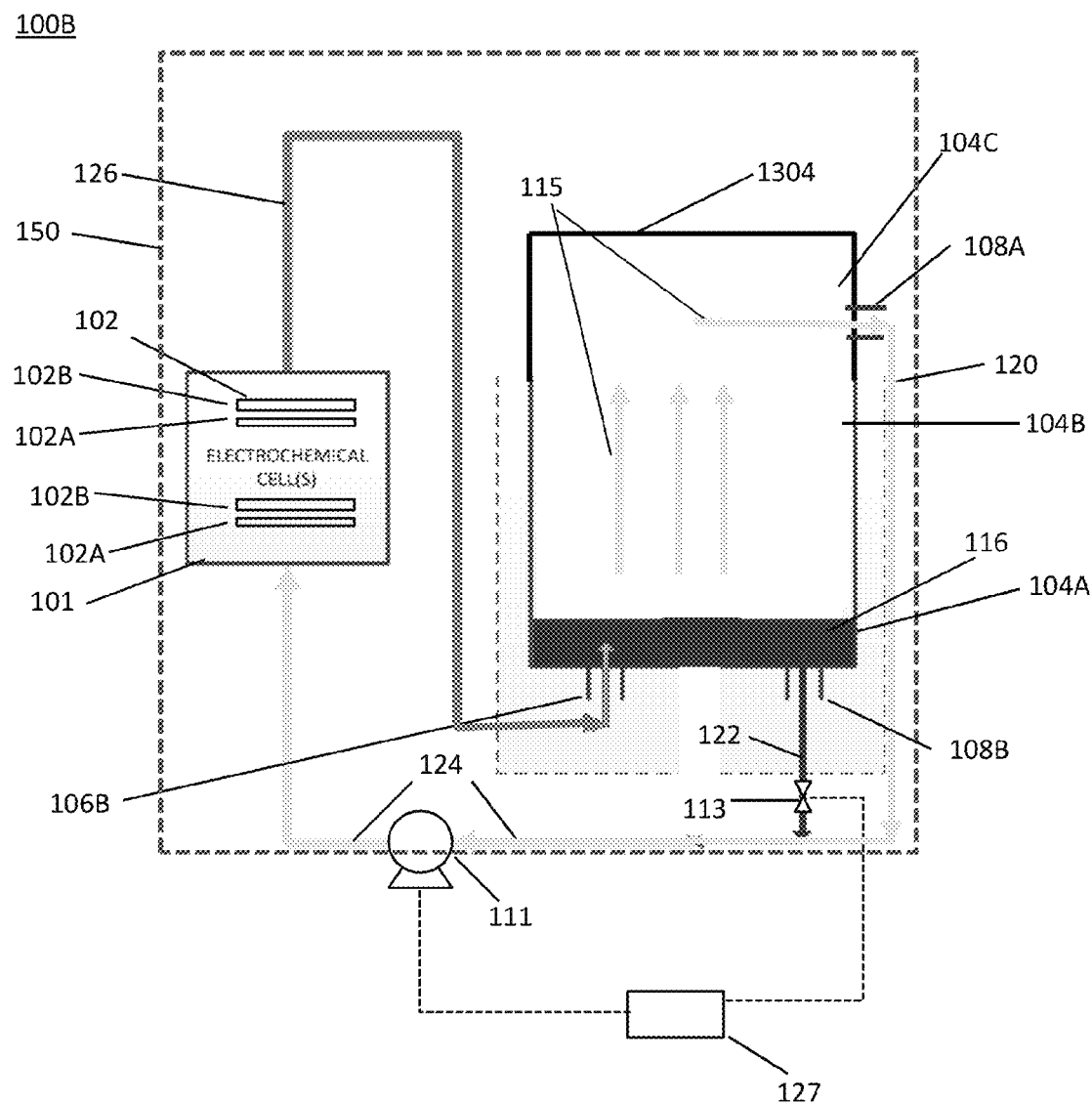

While a cylindrical baffle is shown in the embodiment of FIG. 1A, other baffle configurations may be used, such as plate shaped baffles shown in FIG. 2 and described below. Furthermore, as shown in FIGS. 13 and 14, the baffles may be omitted entirely. Thus, the fluid flow path need not be annular and alternative component geometries may be used.

Figure 1B:
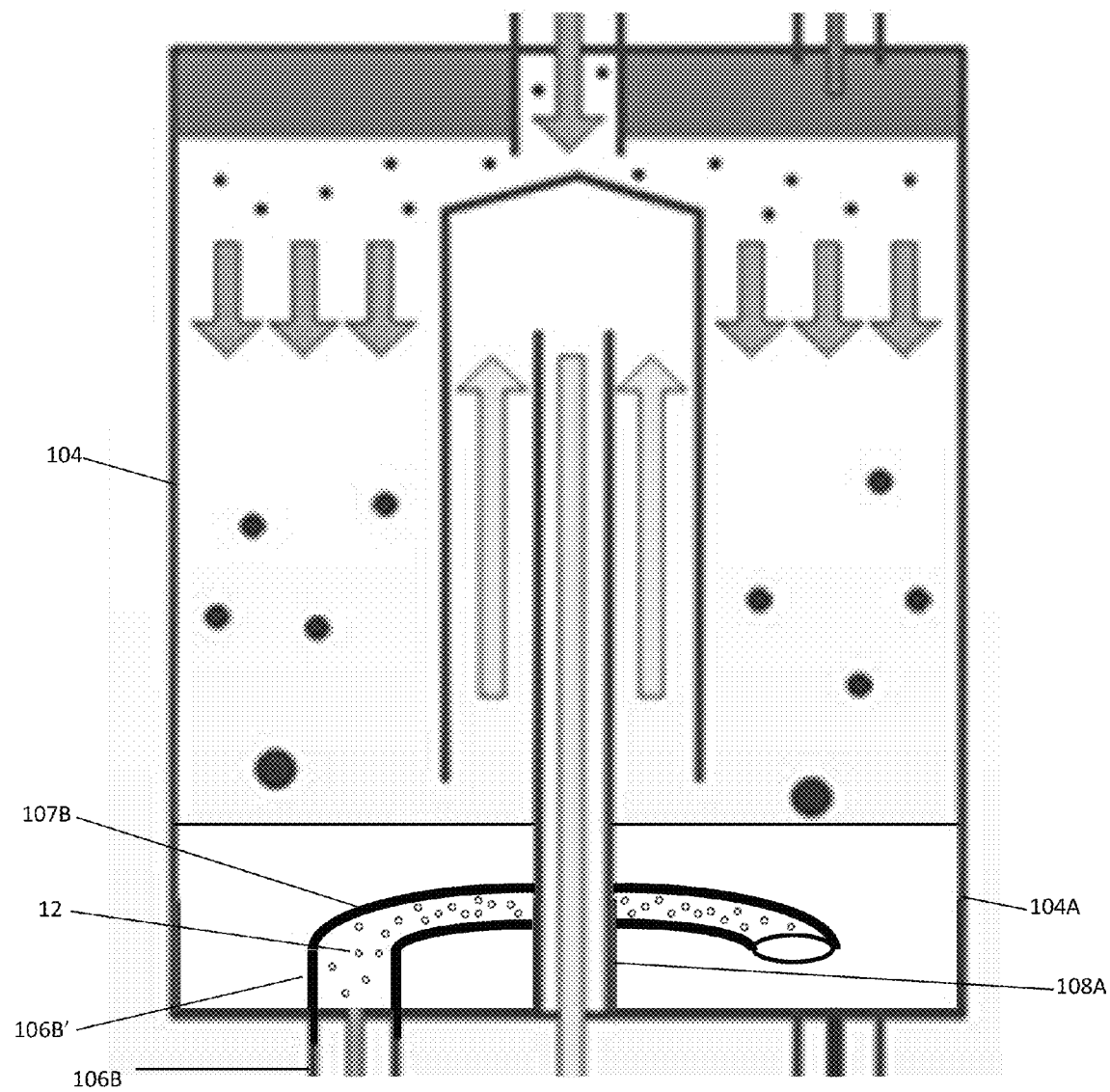
Figure 1C:
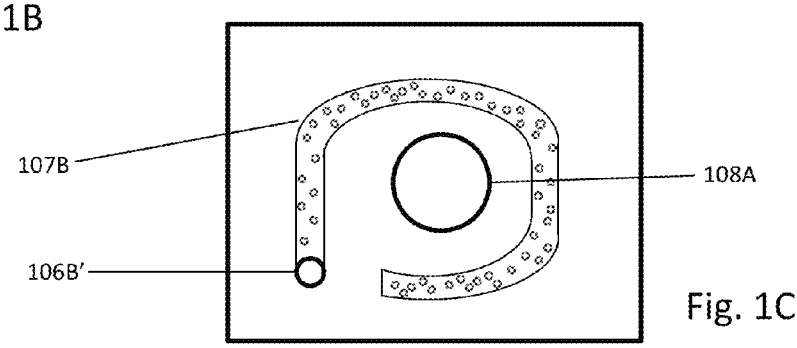
FIG. 1C is a plan view of a device according to an embodiment of the invention.

Optionally, as illustrated in FIGS. 1B and 1C, the secondary inlet 106B may include a diffuser which diffuses the inlet stream inside the lower portion 104A of the reservoir 104. The diffuser may comprise any conduit located inside the reservoir 104 which gradually releases or diffuses the fluid provided through inlet 106B into the reservoir. For example, the diffuser may comprise a porous conduit, such as a porous pipe, porous plate or porous plates separated by a channel. As used herein, the term porous includes conduits made of perforated non-porous materials and conduits made of porous material. For example, the pipe may comprise a porous plastic or metal material which is resistant to the chemicals used in the flow battery, such as polyethylene (e.g., high density polyethylene, HDPE), fluoropolymers, such as polyvinylidene difluoride (PVDF), perfluoroalkoxy (PFA) or polytetrafluoroethylene (PTFE), etc. In the example of FIGS. 1B and 1C, the diffuser is a porous pipe 106B' which extends into the lower portion of the reservoir and which is fluidly connected to the inlet 106B. As used herein, the term fluidly connected means a direct or indirect connection such that a fluid flows directly or indirectly from the initial connection point to the second connection point through one or more conduits, manifolds, baffles, diffusers, etc.

Electrolyte enters the reservoir 104 by passing through the pores or perforations 12 in the porous pipe 106B'. Electrolyte provided to the reservoir 104 in this manner produces less turbulence in the reservoir 104 than electrolyte provided from a single outlet of a non-porous pipe. In an embodiment, the porous pipe 106B' comprises a non-horizontal segment, such as a vertical segment (i.e., having an axis parallel to the force of gravity) connected to the secondary inlet 106B and a non-vertical porous extension segment, such as a horizontal extension 107B segment. For example, the extension may comprise a curved or coiled extension 107B which may extend at least in part (e.g., curve or coil) around the primary outlet conduit 109. The electrolyte can be distributed more evenly to the lower portion 104A of the reservoir 104 through the extension 107B. It should be noted that other extension configurations may be used, such as straight extension and/or angled extension which has a portion which is positioned in a direction between vertical and horizontal.

Figure 1D:
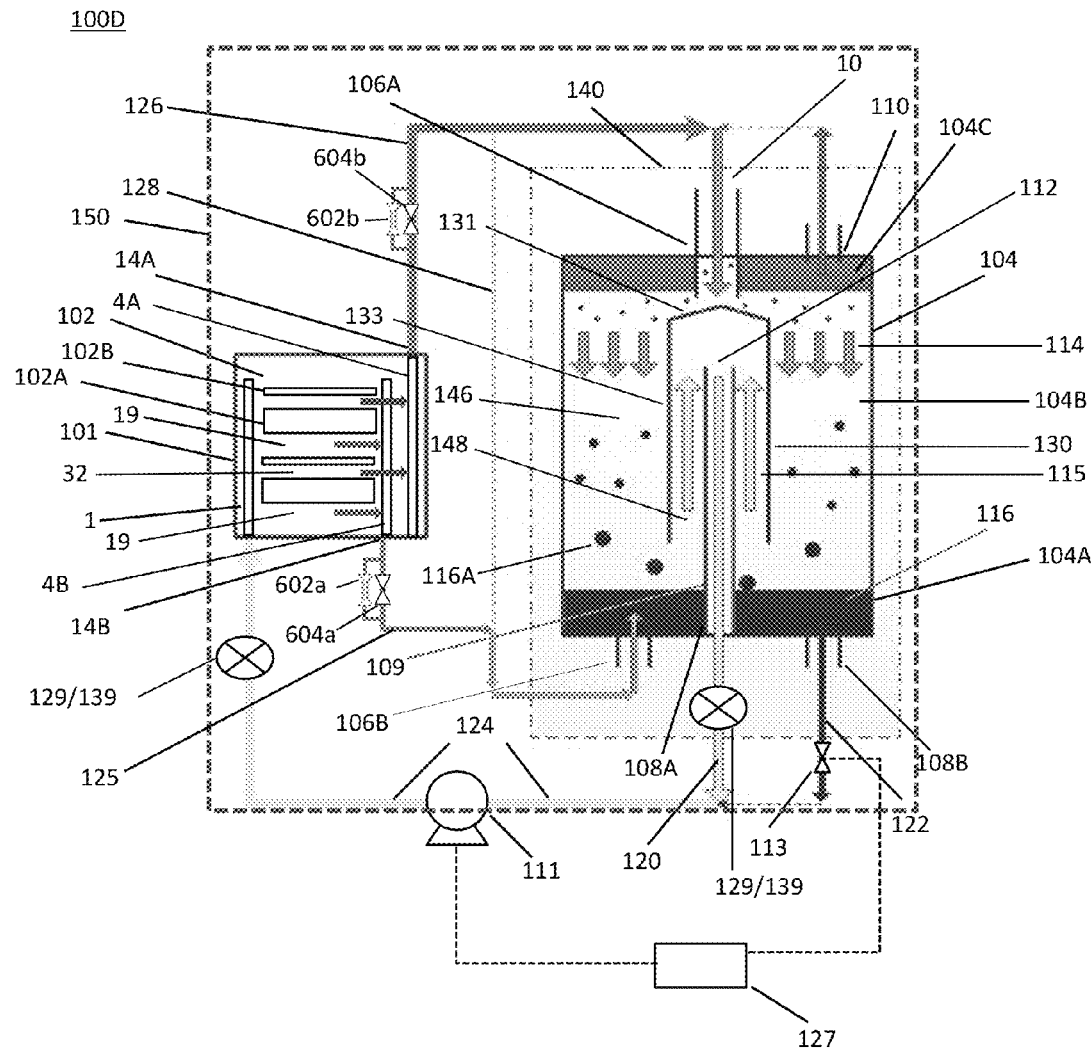

In another embodiment illustrated in FIG. 1D, the portion of the electrolyte poor in the complexed halogen phase (which is alternatively referred to as the "aqueous" phase) exits the stack 101 through a different outlet than the portion of the electrolyte rich in the complexed phase (which is alternatively referred to as the "complex" phase). In this embodiment, the electrolyte delivered to the stack 101 of electrochemical cells 102 may be distributed to the cells 102 in the stack 101 via an input manifold 1. In an embodiment, the electrolyte exiting the stack 101 of electrochemical cells 102 is split in the stack 101 of electrochemical cells 102 before being sent to the reservoir 104.

A first portion of the electrolyte poor in the complexed halogen phase (i.e., the "aqueous" phase) passes through the reaction zone 32 between the negative, impermeable electrode 102B and the positive, permeable electrode 102A. This aqueous phase is channeled through a first outlet manifold 4A to first stack outlet 14A, which is connected to a first outlet conduit 126. The electrolyte is then provided from the first stack outlet 14A through the first outlet conduit 126 and the primary inlet 106A into the reservoir 104. Thus, the first outlet conduit 126 fluidly connects the first stack outlet 14A to the primary electrolyte inlet of the reservoir.

A second portion of the electrolyte rich in the complexed halogen phase (the "complex" phase) passes through the positive, permeable electrode 102A to a flow channel 19 below the positive, permeable electrode 102A. The complex phase is channeled through a second manifold 4B to a second stack outlet 14B, which is connected to a second outlet conduit 125. The electrolyte is then provided from the second stack outlet 14B through the second outlet conduit 125 and the secondary inlet 106B into the reservoir 104. Thus, the second outlet conduit 125 fluidly connects the second stack outlet 14B to the secondary electrolyte inlet of the reservoir. The first portion of the electrolyte (i.e., the "aqueous" phase) comprises the majority of the electrolyte (e.g., 60-95 volume %, such as 80-85 volume %) and the second portion of the electrolyte (i.e., the "complex phase") comprises the minority of the electrolyte (e.g., 5-40 volume %, such as 15-20 volume %).

In the embodiment illustrated in FIG. 1D, the second, complex rich portion of the electrolyte is provided to the lower portion 104A of the reservoir 104 via conduit 125 and the secondary inlet 106B, and the first, complex poor portion of the electrolyte is provided to the reservoir 104 via the upper portion 104C of the reservoir 104 via conduit 126 and inlet 106A. In alternative embodiments discussed in more detail below and shown in FIGS. 17A-17C, both the first and second portions of the electrolyte may be provided to the lower portion 104A of the reservoir 104 when both inlets 106A, 106B are located in the lower portion (e.g., in the stagnant zone) of the reservoir.

Optionally, conduits 125 and 126 may be provided with calibrated pipe restrictions 602a, 602b and/or on/off valves 604a, 604b, in order to control the flow ratios of the exit flow streams. The pipe restrictions comprise a narrow pipe or orifice that has a smaller width or diameter than conduits 125, 126.

Figure 2:
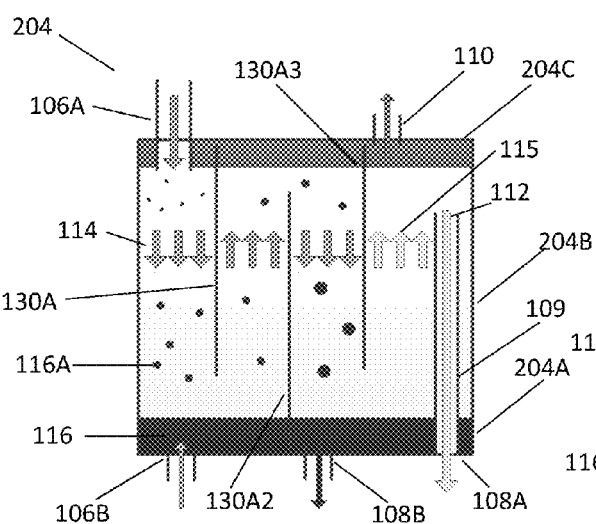

FIG. 2 illustrates another embodiment of a reservoir 204 that may be used with the electrochemical system 100. In contrast to the previous embodiment, the electrolyte flow in the reservoir 104 in this embodiment is not annular. In this embodiment, reservoir may include one or more plate shaped baffles, such as a series of interdigitated baffle plates 130. Baffle plate(s) 130 may comprise one or more plates which are attached inside the reservoir 104 by welding, bolting, etc. or they may comprise portions of the reservoir wall(s) which are bent inwards to create flow separation inside the inner reservoir volume.

The electrolyte mixture 114 enters the reservoir 204 via a primary inlet 106A in a portion of the reservoir 204 and flows downward in a channel formed between the sidewall of the reservoir 204 and a first baffle plate 130A that extends from the top wall of the reservoir 204 and ends in the middle portion 204B of the reservoir 204. In other words, the electrolyte mixture flows 114 down on a first (e.g., left) side of the vertical, plate shaped baffle 130A. The denser, complexed halogen phase 116 sinks to the lower portion 204A of the reservoir 204. The non-complexed aqueous electrolyte 115 passes under the lower edge of the baffle plate 130A and flows up against the force of gravity due to the action of the pump 111 pulling the electrolyte through outlet 108A and conduit(s) 120, 124 toward the pump 111. Thus, the liquid metal-halide solution 115 flows upward against the force of gravity on a second (e.g., right) side of the baffle 130A while the complexed halogen phase 116 settles in the stagnant zone 204A below the baffle 130A. In an embodiment, if the desired amount of complexed halogen phase 116 is removed from the mixture 114, the non-complexed aqueous electrolyte 115 may be removed from the middle portion 204B of the reservoir 204 via an outlet conduit 109 located on the upward flow side of the baffle 130.

Optionally, if it is desired to remove additional complexed halogen phase 116 from the mixture 114, additional baffle plates 130A2, 130A3 may be provided as illustrated in FIG. 2. Preferably the second baffle plate 130A2 does not extend all the way to the bottom wall of the reservoir 204 or includes opening(s) in the lower portion 204A of the reservoir 204 to allow the complexed halogen to flow across the lower portion 204A of the of the reservoir 204. The second baffle plate 130A2 also does not extend all the way to the upper portion 104C of the reservoir or contains opening(s) in portion 104B below portion 104C. Likewise, the first 130A and the third 130A3 baffle plates do not extend to the all the way to the lower portion (i.e., stagnant zone) 104A of the reservoir or contain opening(s) in portion 104B above portion 104A.

After flowing up against the force of gravity the mixture 114 flows over the second baffle plate 130A2 down a channel formed between the second baffle plate 130A2 and a third baffle plate 130A3. The denser, complexed halogen phase 116 in the mixture 114 sinks to the lower portion 204A of the reservoir 204. The non-complexed aqueous electrolyte 115 passes under the lower edge of the baffle plate 130A3 and flows up against the force of gravity.

Thus, the electrolyte mixture 114 flows down on a first (e.g., left) side of a first baffle 130A of the plurality of the interdigitated plate shaped baffles. Then, the liquid metal-halide solution 115 flows upward against the force of gravity on a second (e.g., right) side of the first baffle 130A followed by flowing between, over or under remaining interdigitated plate shaped baffles 130A2, 130A3, while the complexed halogen phase 116 settles in the stagnant zone 204A below the baffles.

If the desired amount of complexed halogen phase 116 is removed from the mixture 114, the non-complexed aqueous electrolyte 115 may be removed from the middle portion 204B of the reservoir 204 via an outlet conduit 109 located on the upward flow side of the baffle 130A3. In alternative embodiments, additional baffle plates 130A may be added, as described above.

Optionally, the reservoir 204 may include a secondary inlet 106B in a lower portion 204A of the reservoir 204 through which the complexed halogen phase 116 or a mixture 114 of liquid metal-halide electrolyte solution 115 and complexed halogen phase 116 may be provided to the lower portion 204A of the reservoir 204. The reservoir 204 may also optionally include a secondary outlet 108B located in a lower portion 204A of the reservoir 204 through which the complexed halogen phase may be removed from the reservoir 204. Additionally, the reservoir 204 may include a gas outlet located in an upper portion 204C of reservoir 204 through which gas may be removed from the reservoir 204.

Figure 3:
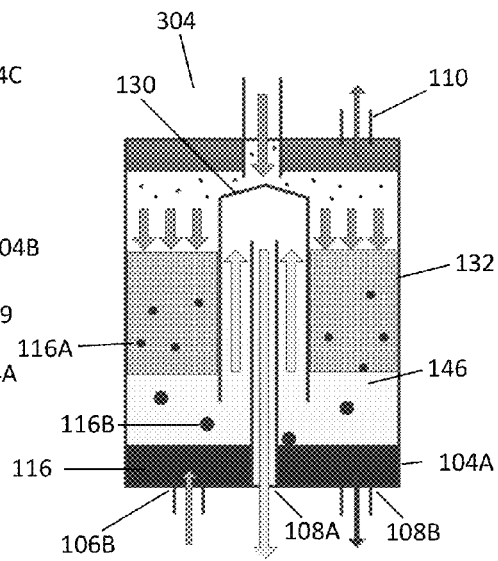

FIG. 3 illustrates another embodiment of a reservoir 304 which may be used with the electrochemical system 100. The reservoir 304 of this embodiment is similar to the reservoir 104 illustrated in FIG. 1A. However, in this embodiment, the reservoir 304 further includes one or more coalescing filters 132 located between the wall of the reservoir 104 and the sidewall 133 of the cylindrical baffle 130. Thus, the filter 132 may have an annular shape enclosing the baffle 130 in the middle such that the filter 132 is located in the outer annular passage 146 in the path of the electrolyte mixture 114 downward flow direction.

Figure 5:
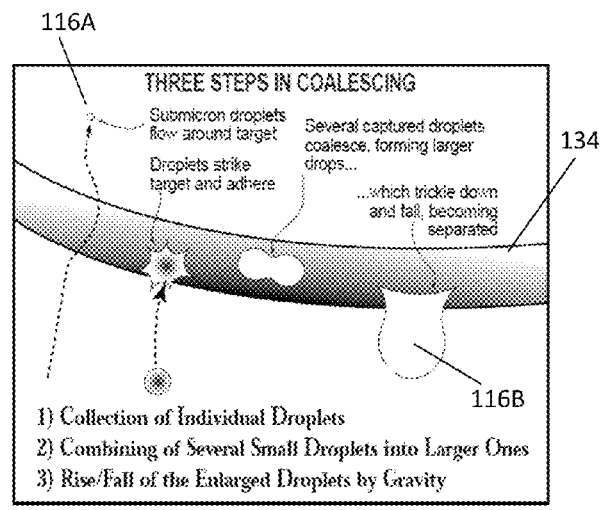
FIG. 5 is a schematic illustration of a portion of a coalescing filter.

The operation of the coalescing filter(s) 132 is illustrated in FIG. 5. The coalescing filter 132 comprises fine structures 134, such as fibers, which collect small droplets 116A of the complexed halogen phase 116. The fibers 134 may comprise polymer fibers, such as Teflon based fibers, for example polypropylene fibers. That is, the material of the fine structures 134 is selected such that the droplets 116A of complexed halogen 116 selectively adsorb to the surface of the fine structures 134. When several small droplets 116A touch each other, the surface tension of the droplets 116A causes the several small droplets 116A to coalesce into a single, larger droplet 116B. When the larger droplets 116B get large enough, the force of gravity exceeds the adsorption force and the droplet 116B falls off the fine structures 134 of the coalescing filter 132 and flows down to the stagnant zone 104A.

Figure 4:
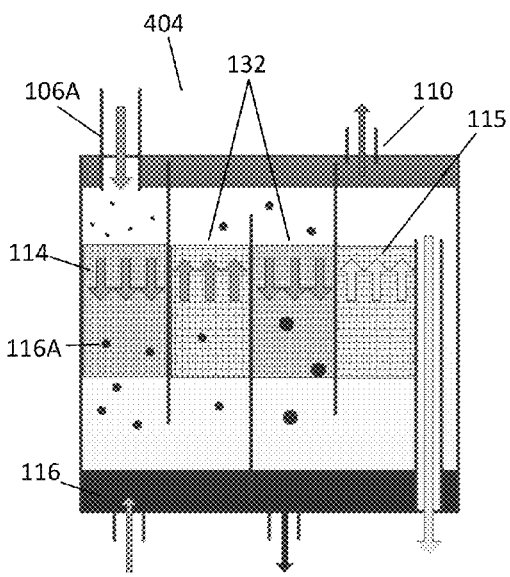

FIG. 4 illustrates another embodiment of a reservoir 404 which may be used with the electrochemical system 100. The reservoir 404 of this embodiment is similar to the reservoir 304 illustrated in FIG. 2. However, in this embodiment, the reservoir 404 further includes one or more coalescing filters 132 between baffles 130 in the downward and/or upward electrolyte flow directions. In this manner, the complexed halogen 116 can be more quickly separated from the mixture 114 of liquid metal-halide electrolyte solution 115 and complex halogen phase 116.

Figure 8:
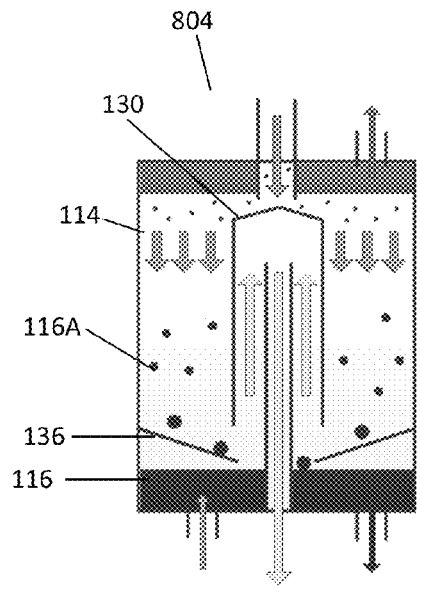
Figure 9:
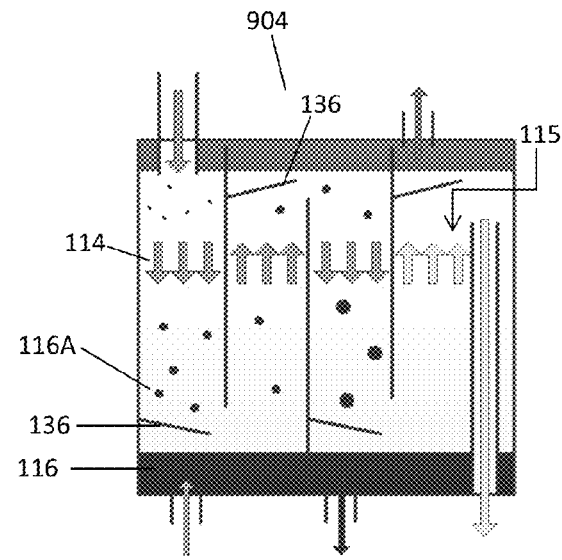

FIGS. 6 and 7 illustrate alternative embodiments of reservoirs 604 and 704 which may be used with the electrochemical system 100. The reservoirs 604 and 704 of these embodiments are similar to the reservoirs 304 and 404 illustrated in FIGS. 3 and 4 respectively. However, in these embodiments, the reservoirs 604, 704 further include one or more optional settlers 136 in addition to the coalescing filters 132. Preferably, the settlers 136 are located downstream from the filters 132. FIGS. 8 and 9 illustrate embodiments of reservoirs 804 and 904 that are similar to the reservoirs 604 and 704 illustrated in FIGS. 6 and 7, respectively. However, the embodiments illustrated in FIGS. 8 and 9 include one or more settlers 136 but do not include coalescing filters 132. Thus, the optional settlers 136 may be used with or without the one or more coalescing filters 132.

The operation of the one or more settlers 136 is illustrated in FIGS. 10 and 11. The settler(s) 136 shown in FIG. 10 typically include two or more generally parallel plates 137 held together a distance h apart to form a channel 135 through which the mixture 114 of liquid metal-halide electrolyte solution 115 and complex halogen phase 116 flows.

Similarly to the coalescing filter 132, the settler plates 137 are made of a material to which the complex halogen 116 preferably adsorbs. As the mixture 114 flows between the channels 135, small droplets 116A of complexed halogen 116 adsorb to the settler plates 137. When several smaller droplets 116A touch, the surface tension causes the smaller droplets 116A to coalesce into larger droplets 116B. The length L of the settler plates 137 is selected such that there is sufficient time for the smaller droplets 116A to coalesce into larger droplets or a continuous stream of complexed halogen phase 116B. The complexed halogen phase 116B then settles to the stagnant zone 104A.

FIG. 11 illustrates an alternative embodiment of the settler 136B. In this embodiment, the settler 136B comprises corrugated plates 137B. Preferably, the mixture 114 flows in a non-parallel direction (e.g., perpendicular direction) to the axis of corrugation. Thus, the mixture flows over and under the corrugations in the plates. In this manner, the mixture 114 is exposed to a greater surface area over a distance L than with the flat settler plates 137 illustrated in the embodiment of FIG. 10.

Figure 12:
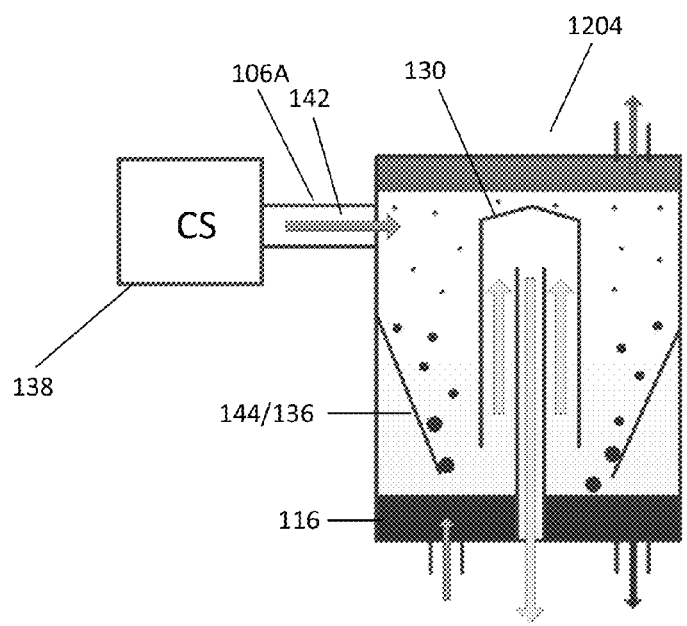

FIG. 12 illustrates another embodiment. In this embodiment, a cyclonic separator 138 is operatively connected to the primary inlet 106A. In an aspect, the cyclonic separator 138 is configured so that a rotational fluid flow 142 is formed non-parallel (e.g., perpendicular) to the direction of the force of gravity and the gravitational fluid flow direction. In this aspect, the rotational fluid flow results in a centrifugal force that promotes separation of denser fluids, e.g. the complexed halogen 116 on the outside and the electrolyte 115 on the inside of the rotational fluid flow. In another aspect, the reservoir 1204 optionally includes one or more slanted baffles 144 or settlers 136 which reduce the effective diameter of the reservoir 1204 towards the bottom of the reservoir 1204 compared to toward the top of the reservoir 1204. The one or more baffles 144 or settlers 136 further accelerate the fluid and increase separation. In this aspect, the baffles 144 or settlers 136 lower the volumetric packaging efficiency in the reservoir 1204 compared to the embodiments discussed above.

FIG. 13 illustrates another embodiment system 100A. In this embodiment, the reservoir 1304 lacks any baffles 130 or other flow separators. Preferably the reservoir 1304 also lacks the filter 132 and settler 136. In this embodiment, the primary inlet 106A above the stagnant zone 104A may be omitted, and the electrolyte mixture 114 is provided into the from the stack 101 through conduit 126 into the reservoir 1304 through the secondary inlet 106B located in the stagnant zone 104A. The secondary inlet 106B provides the electrolyte mixture 114 at the stagnant zone (i.e., directly into the stagnant zone) at a bottom of the reservoir housing (rather than toward the stagnant zone as provided by the primary inlet 106A in prior embodiments). The liquid metal-halide electrolyte solution 115 flows upward by pump 111 suction against the force of gravity from the stagnant zone 104A to reach the inlet opening 112 at an upper portion of the conduit 109, while the heavier complexed halogen phase 116 remains and settles in the stagnant zone 104A. Thus, the metal-halide electrolyte solution 115 flows upward along the outside of the conduit 109 until it reaches the opening 112 and then flows downward through the conduit 109 and out of the reservoir 1304 through electrolyte outlet 108A in the lower portion 104A of the reservoir 1304.

FIG. 14 illustrates another embodiment system 100B. System 100B is similar to system 100A of FIG. 13, except that the conduit 109 is omitted in system 100B and the outlet 108A is located in the middle portion 104B rather than the lower portion 104A of the reservoir 1404. Thus, in system 100B, the liquid metal-halide electrolyte solution 115 flows upward by pump 111 suction against the force of gravity from the stagnant zone 104A to reach the electrolyte outlet 108A in the middle portion 104B of the reservoir 1404 while the heavier complexed halogen phase 116 remains and settles in the stagnant zone 104A.

Figure 15:
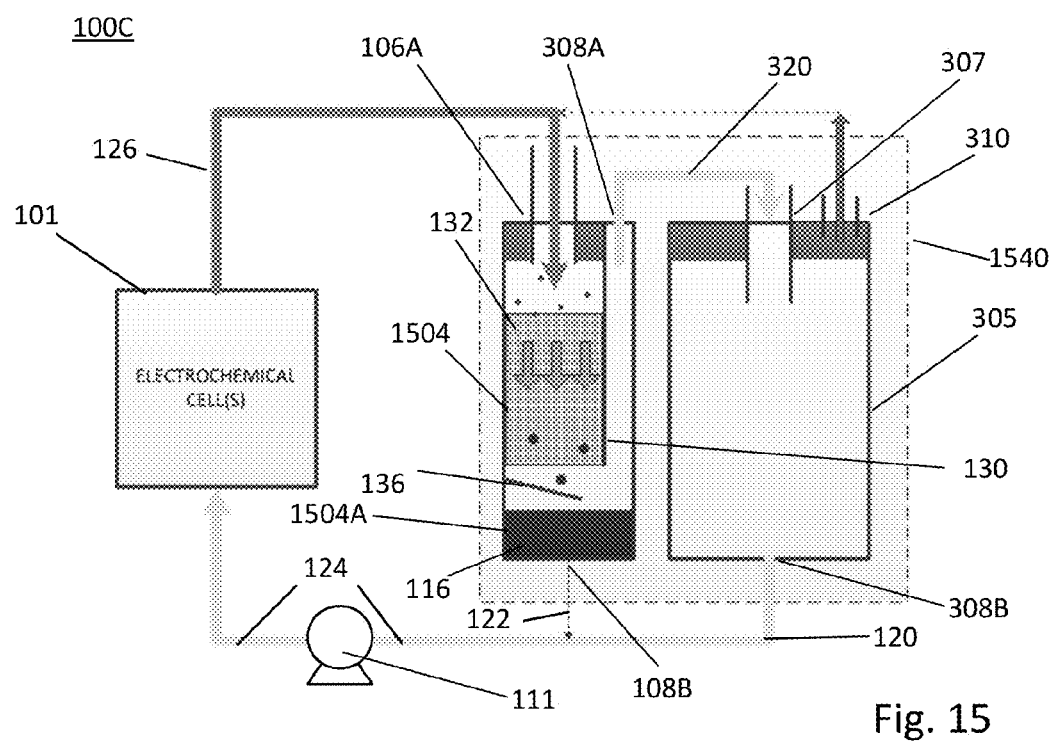

FIG. 15 illustrates an electrochemical system 100C according to another embodiment. In this embodiment, the reservoir subsystem 1540 of the electrochemical system 100C contains plural reservoirs, such as a first reservoir 1504 which is the same or similar to the reservoirs 104, 204, 304, 404, 605, 704, 804, 904, 1204, 1304 or 1404 described above and an additional second reservoir 305 for storing the aqueous electrolyte 115.

For example, the system 100C includes the first reservoir 1504 that includes the single plate shaped baffle 130A shown in FIG. 2 and optionally the coalescing filter 132 and/or a settler 136. The first reservoir 1504 includes the lower portion (e.g., stagnant zone) 1504A in which complexed halogen phase 116 may be stored. Metal-halide electrolyte solution 115 separated from the complexed halogen phase 116 may be removed from the first reservoir 1504 via the main outlet 308A located in a portion of the reservoir 1504 above the lower portion 1504A.

However, in this embodiment, the metal-halide electrolyte solution 115 removed from the outlet 308A of the first reservoir 1504 is provided via conduit 320 to the second reservoir 305 rather than back into the stack 101. Preferably, the electrolyte solution 115 is provided into the second reservoir via an inlet 307 in upper portion of the second reservoir 305. When desired, the metal-halide electrolyte solution 115 stored in the second reservoir 305 may be provided to the stack 101 of electrochemical cells 102 via an outlet 308B in the second reservoir 305 using suction from the pump 111. Gas located in the second reservoir 305 may be removed from the second reservoir 305 via a gas outlet 310 located in an upper portion of the second reservoir 305.

Figure 16:
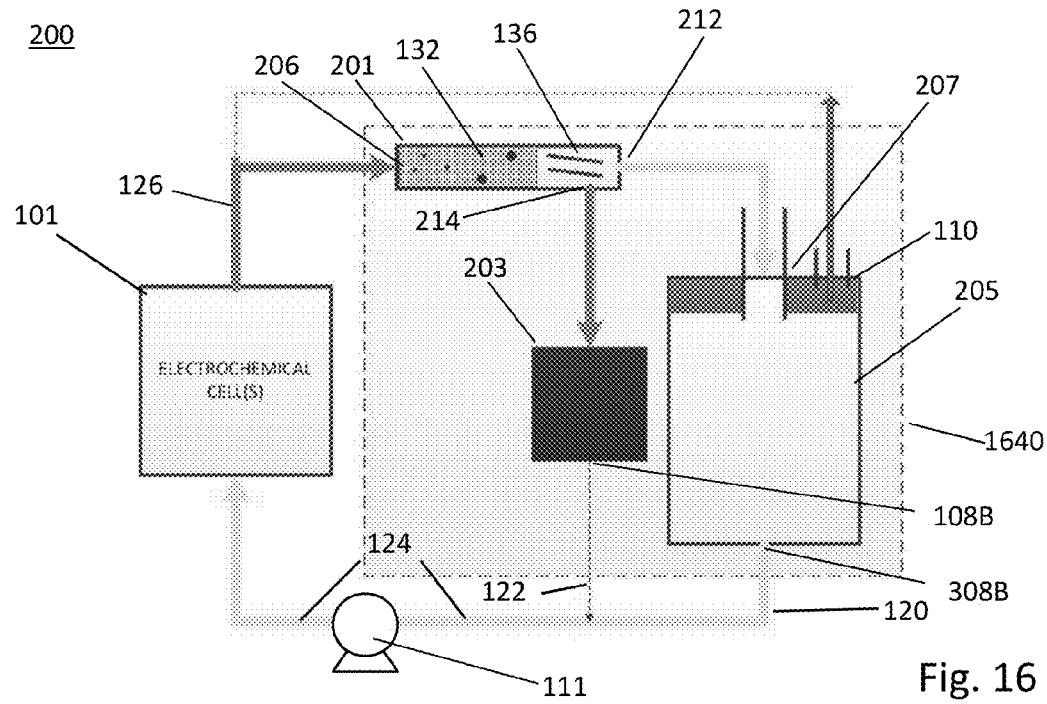

FIG. 16 illustrates an electrochemical system 200 according to another embodiment in which the reservoir subsystem 1640 contains three chambers. In this embodiment, the electrochemical system 200 includes a separate chamber (e.g., flow tube, tank, reservoir, etc.) 201 to hold the coalescing filter 132 and/or settler 136. The electrochemical system 200 also includes a separate complexed halogen 116 reservoir 203 and a separate liquid metal-halide electrolyte solution 115 reservoir 205. The separate chamber 201 includes an inlet 206 which is configured to receive a mixture 114 of liquid metal-halide electrolyte solution 115 and complex halogen phase 116 from the stack 101 of electrochemical cells. The separate chamber 201 also includes a first outlet 212 which is configured to provide liquid metal-halide electrolyte solution 115 from the separate chamber 201 to the metal-halide electrolyte solution 115 reservoir 205 via inlet 207 in the metal-halide electrolyte solution 115 reservoir 205. The separate chamber 201 also includes a second outlet 214 configured to provide complexed halogen 116 to the complexed halogen 116 reservoir 203. The second outlet 214 is located below the first outlet 212. The other elements are similar to those described with regard to the prior embodiments. As illustrated, the separate chamber 201 is oriented in a horizontal configuration (e.g. with a flow axis perpendicular to the force of gravity). Alternatively, the separate chamber 201 can be configured with a vertical orientation (e.g. with a flow axis parallel to the force of gravity).

FIGS. 17A-17D illustrate alternative embodiments of an electrochemical system 1800. The system 1800 is similar to the system 100D shown in FIG. 1D and similarly numbered elements in common between these systems will not be described further for brevity.

However, in this embodiment, both the primary inlet 106A to the reservoir 104 and the secondary inlet 106B to the reservoir 104 are located in the lower portion 104A of the reservoir 104. The primary inlet 106A is connected to the first outlet manifold 4A and the first stack outlet 14A in the stack 101 via the first outlet conduit 126, while the secondary inlet 106B is connected to a second outlet manifold 4B and the second stack outlet 14B via the second outlet conduit 125. Similar to the system 100D of the embodiment illustrated in Figure 1D, a portion of the electrolyte poor in complexed halogen phase is provided to the reservoir 104 from the first outlet manifold 4A and the first stack outlet 14A via conduit 126 and inlet 106A. A portion of the electrolyte rich in complexed halogen phase is provided to the reservoir 104 from the second outlet manifold 4B and the second stack outlet 14B via conduit 125 and inlet 106B.

Figure 17A:
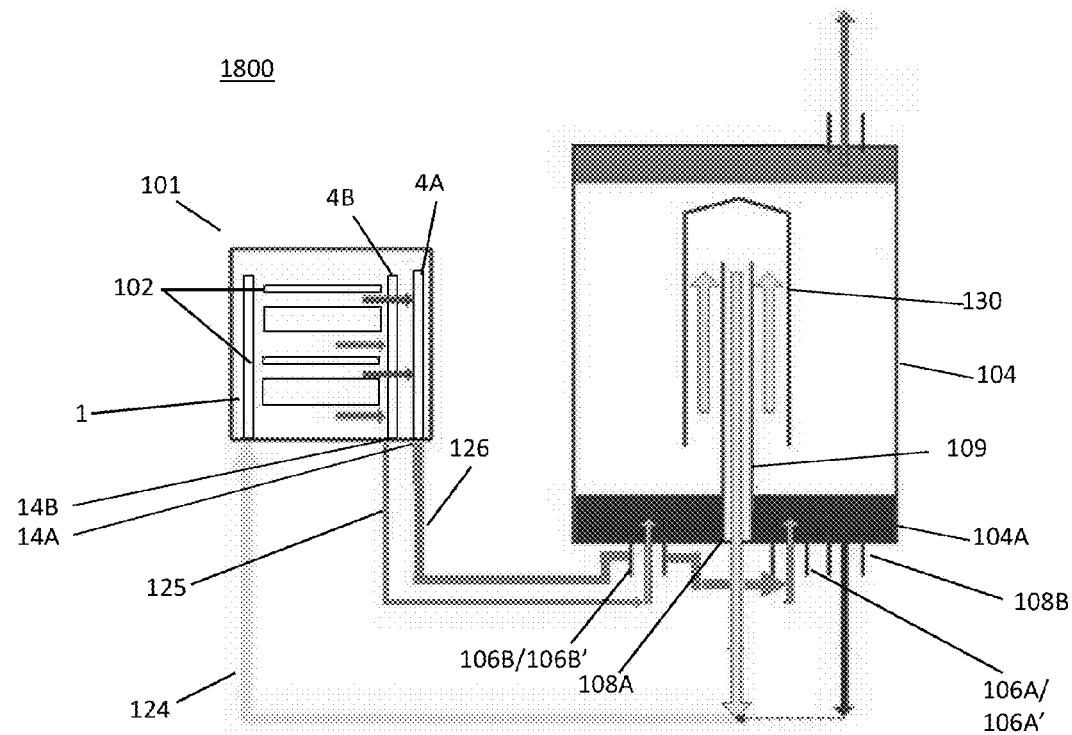

While the first and the second stack outlets 14A, 14B are shown on the bottom of the stack 101 in FIG. 17A for illustrative convenience, it should be understood that one or both stack outlets 14A, 14B may be located on the top and/or the side of the stack 101. Furthermore, while the cylindrical baffle 130 is illustrated in FIGS. 17A and 17C, this baffle is optional and may be omitted or replaced with the plate shaped baffle 2002 illustrated in FIG. 20 and described below.

Figure 17B:
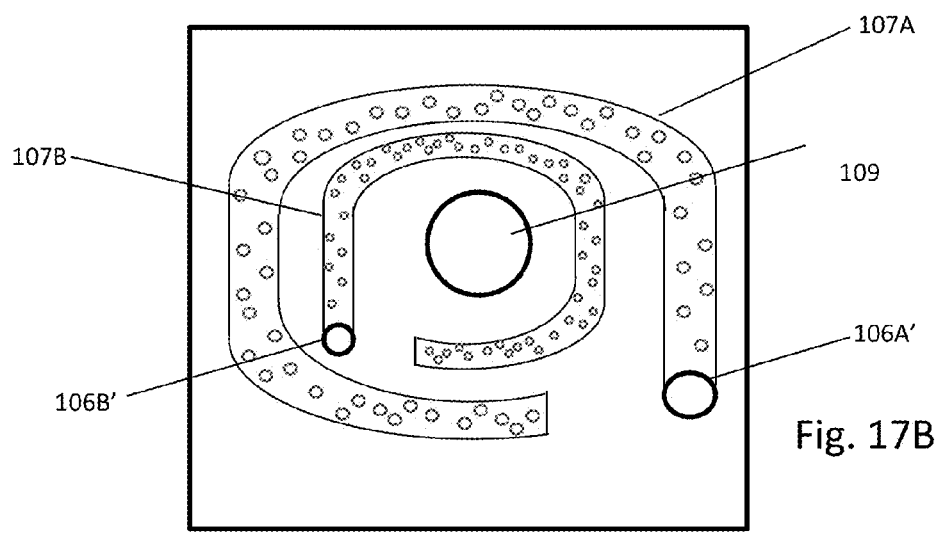
FIG. 17B is a plan view of a device according to an embodiment of the invention.
Figure 17C:
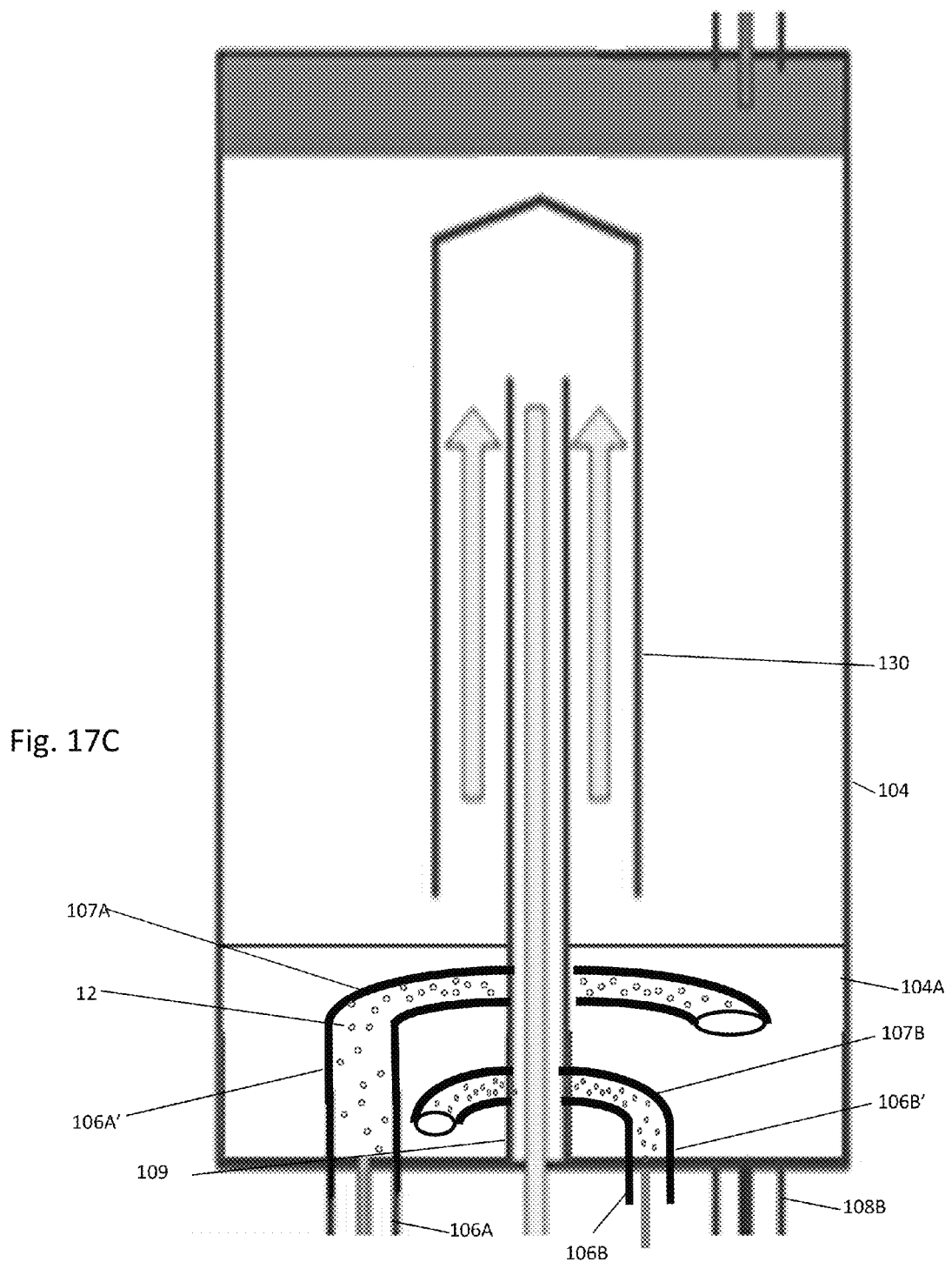
Figure 17D:
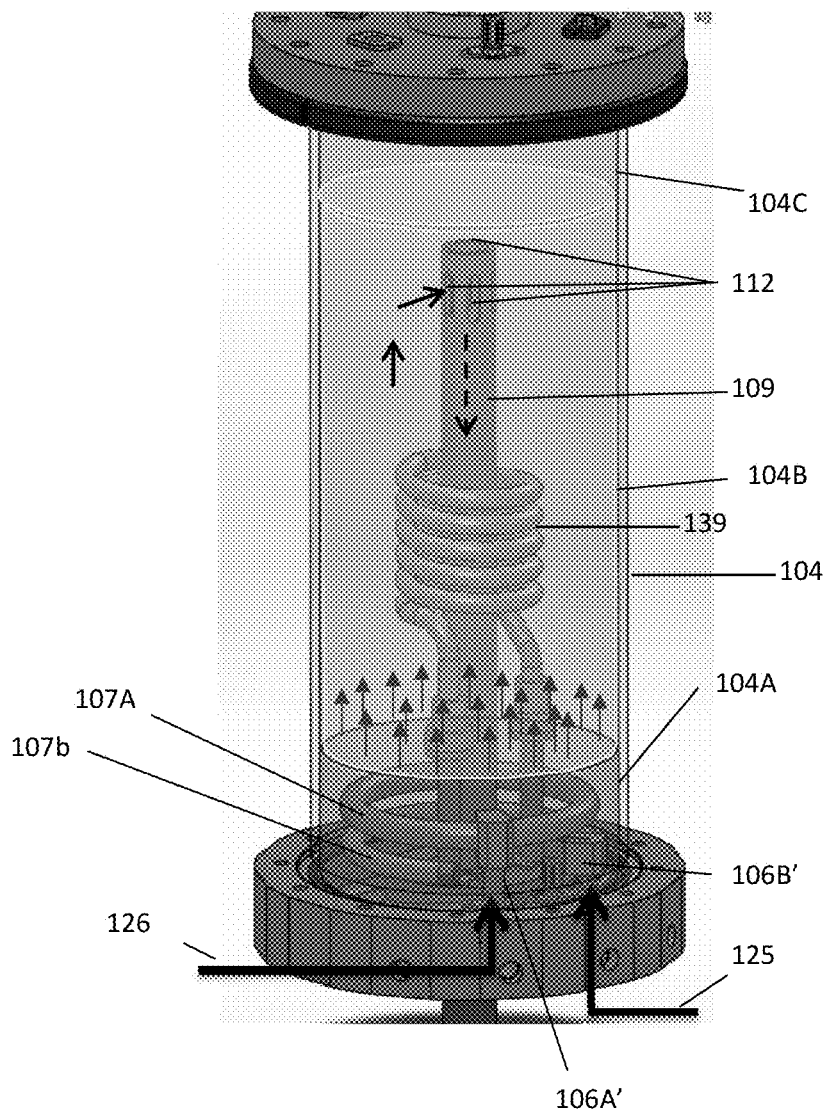
FIG. 17D is a three dimensional perspective view of a device according to an embodiment of the invention.

Preferably, as shown in FIGS. 17B, 17C and 17D, the primary inlet 106A and the secondary inlet 106B may be provided with respective diffusers, such as porous pipes 106A', 106B' or other suitable diffusers. Similar to the embodiment illustrated in FIGS. 1B and 1C, the porous pipes 106A', 106B' may include non-vertical extensions, such as porous horizontal curved extensions 107A, 107B, respectively. The porous horizontal curved extensions 107A, 107B may be located in the same plane (e.g., side by side) in the lower portion 104A of the reservoir 104, in different planes (e.g., one above the other as shown in FIGS. 17C and 17D) or partially in the same plane and partially in different planes. For example, as shown in FIG. 17D, the extension 107A may be located above the extension 107B.

In an embodiment, the majority of the electrolyte from the stack 101 of electrochemical cells 102 is provided through the first outlet manifold 4A. In this embodiment, the porous horizontal curved extension 107A is preferably longer and/or wider (i.e., has a larger diameter if it is a pipe with a circular cross section) than the porous horizontal curved extension 107B. As shown in FIG. 17D, extension 107A may have a circular or semi-circular shape with longer length and/or larger radius of curvature than that of extension 107B. Extension 107A may also have a larger internal width (i.e., internal/cross sectional diameter) than extension 107B. Alternatively, if the majority of the electrolyte is provided from the second manifold 4B, the porous horizontal curved extension 107B may be longer and/or wider than the porous horizontal curved extension 107A, as shown in FIG. 17B.

The extensions 107A, 107B may be coiled around the conduit 109, and may coil around each other. Furthermore, as shown in FIG. 17D, the heat exchanger 139 described above may be located inside the reservoir 104, for example coiled around the conduit 109 in addition to or instead of being located outside of the reservoir 104, as shown in FIG. 1D. Finally, the upper portion of conduit 109 located in the middle portion 104B of the reservoir may optionally have plural openings 112 (e.g., in the sidewall and/or top part of the conduit), as shown in FIG. 17D. Preferably, conduit 109 contains no openings 112 located in the stagnant zone in the lower portion 104A of the reservoir.

Thus, as shown in FIGS. 17B-17D, electrolyte flow is returned to the bottom of the reservoir through two separate diffusers, such as porous diffuser pipes. The electrolyte flow speed through the surface of porous pipe is relatively slow (e.g., below 15 mm/s, such as 10 mm/s or lower, for example below 5 mm/s, such as about 1-4 mm/s, including about 3 mm/s), allowing all of the flow to be returned to the bottom of the reservoir without significantly re-mixing the two separated fluid layers (i.e., the aqueous phase and complex phase). All of the returned electrolyte flow passes slowly through the stagnant zone containing the layer(s) of complex, enhancing the degree to which aqueous bromine flowing from the stack is sequestered by the complexing agent before returning to the stack. The entire reservoir cross-section may be utilized for flow, thereby minimizing average velocity and further enhancing separation of the two fluid layers. The addition of the porous diffuser should improve the flow battery system efficiency by at least three percent (e.g., an about 4-5 percent increase in voltaic efficiency, an about 3-4 percent increase in Coulombic efficiency, and an about 5-6% increase in DC energy efficiency).

Figure 18:
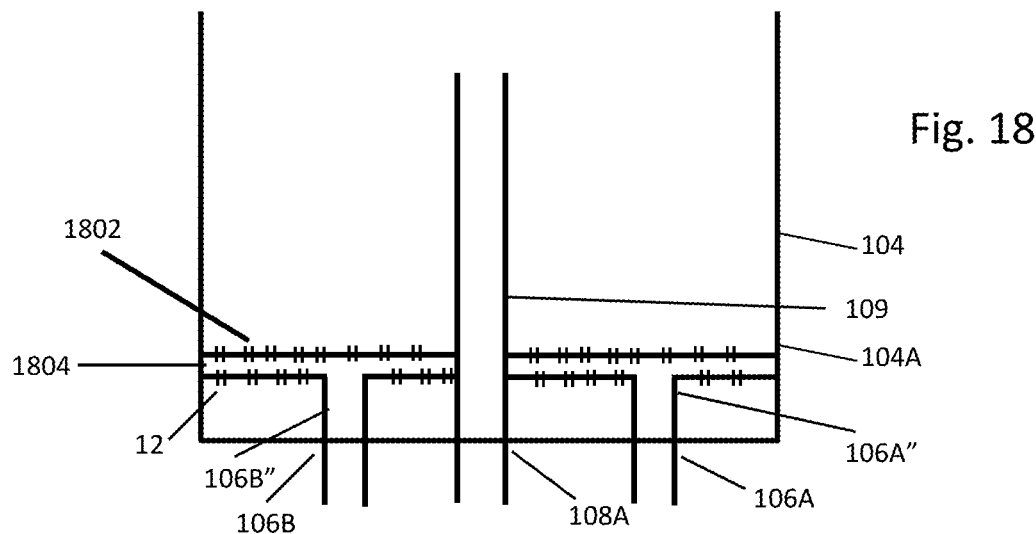

FIG. 18 illustrates an alternative embodiment in which the diffuser comprises porous plates 1802 rather than porous pipes 106A', 106B' and porous horizontal curved extensions 107A, 107B. The plate diffuser includes the plates 1802 separated by one or more channels 1804. Preferably, the plates 1802 are parallel to each other and are positioned horizontally in the lower portion 104A of the reservoir 104. The inlets 106A, 106B are connected to the channel(s) 1804 via respective vertical conduits 106A" and 106B" which may be porous or non-porous. Electrolyte supplied to the primary inlet 106A and/or the secondary inlet 106B is provided to the channel(s) 1804 located between the porous parallel plates 1802 via the conduits 106A" and 106B". The electrolyte passes through holes/pores 12 in the parallel plates 1802 to enter the reservoir 104.

Figure 19A:
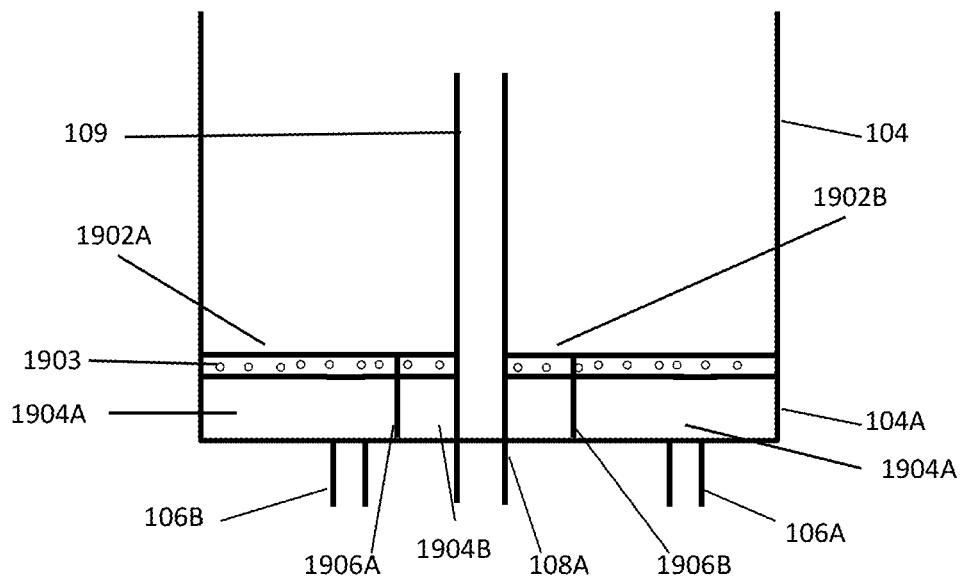
Figure 19B:
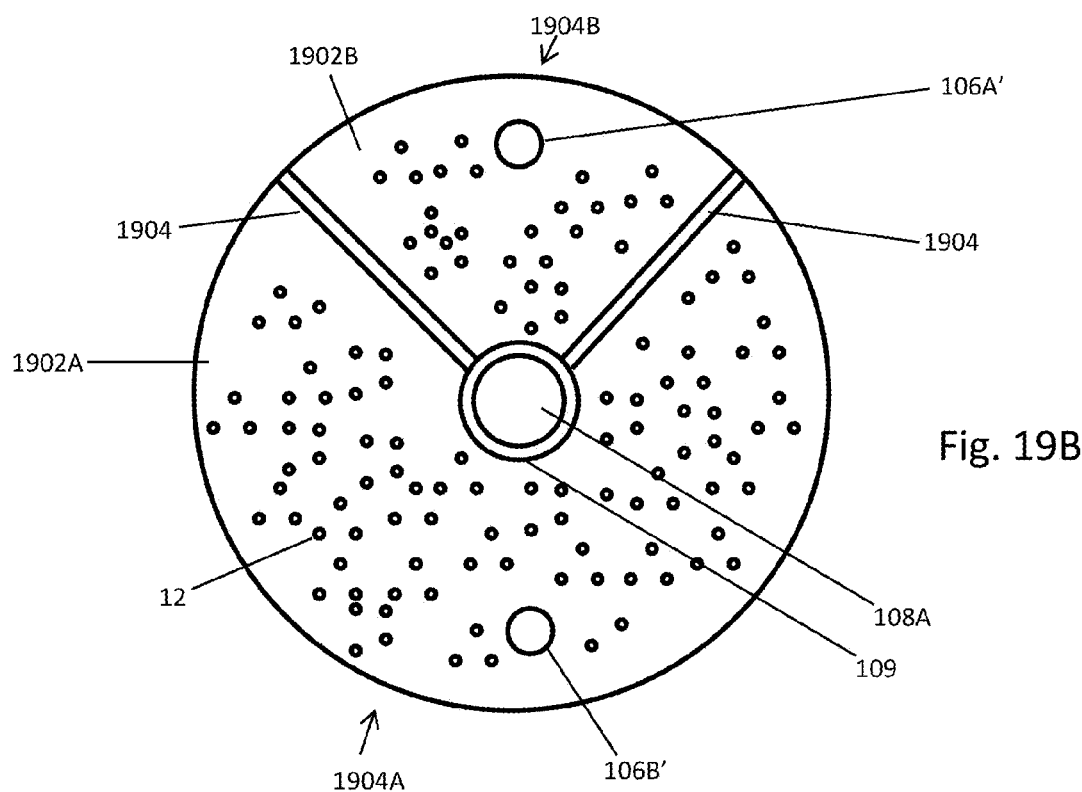
FIG. 19B is a plan view of a device according to an embodiment of the invention.

FIGS. 19A and 19B illustrate an alternative embodiment of the diffuser which comprises one or more porous plates 1902A, 1902B (having pores 1903) instead of parallel plates 1802. In this embodiment, there is no channel between the plates. Instead, the plates partition the reservoir in a non-vertical direction, such as in a horizontal direction, such that all of or a part of the space 1904A, 1904B in the lower portion 104A of the reservoir 104 is located below the porous plates. The space below the porous plates is partitioned into at least two parts 1904A, 1904B by non-horizontal walls 1906A, 1906B, such as vertical walls. Preferably, the walls are non-porous and extend between the bottom surface of the reservoir 104 and the bottom surface of the plates 1902A, 1902B.

Thus, the space 1904A is bounded on the bottom and outer side by the respective bottom and side wall of the reservoir 104, on top by the porous plate 1902A and on the inner sides by the walls 1906A, 1906B and optionally the conduit 109. The space 1904B is bounded on the bottom and outer side by the respective bottom and side wall of the reservoir 104, on top by the porous plate 1902B and on the inner sides by the walls 1906A, 1906B and optionally the conduit 109.

The primary inlet 106A is positioned in the reservoir to provide the complex poor electrolyte ("aqueous" phase) into space 1904A and the secondary inlet 106B is positioned in the reservoir to provide the complex rich electrolyte ("complex" phase) into space 1904B. In this manner, the aqueous phase in space 1904A may be segregated from the complex phase in space 1904B by the walls. The electrolyte then flows out of the spaces 1904A and 1904B through the pores 12 in the porous plates and into the inlet 112 of the conduit 109 located in the middle portion 104B of the reservoir 104.

Since the volume of the aqueous phase is larger than that of the complex phase, it is preferred that space 1904A is larger than space 1904B. In this embodiment, surface area of plate 1902A is larger than surface area of plate 1902B. While two plates 1902A, 1902B are illustrated, it should be understood that a single porous plate (e.g., a circular shaped plate) may be used instead, while the spaces 1904A, 1904B below the plate are defined by the walls 1906A, 1906B.

Figure 20:
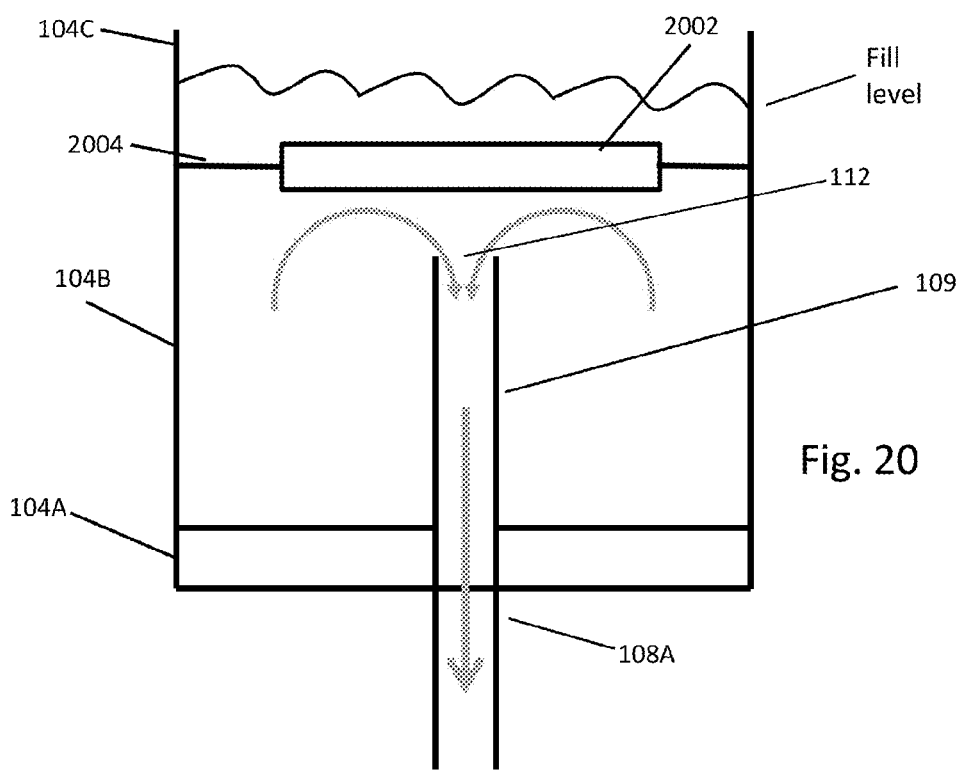

FIG. 20 illustrates another embodiment. In this embodiment, a baffle plate 2002 is used instead of the cylindrical baffle 130. The baffle plate 2002 is located in the middle portion 104B of the reservoir 104 below a fill level of the electrolyte in the reservoir 104 but above the inlet(s) 112 to the conduit 109 that leads to the primary outlet 108A. The baffle plate 2002 reduces the amount of the gas phase or prevents the gas phase in the upper portion 104C of the reservoir 104 from being sucked into the conduit/pipe 109 if a vortex is formed by the electrolyte flowing into the inlet 112 at the top of the conduit 109. The baffle plate 2002 is supported in the reservoir by one or more supporting elements, such as one or more rods 2004. The baffle plate 2002 may be used in the embodiments described above and illustrated in any of the FIGS. 1-19B (e.g., instead of the cylindrical baffle 130).

Figure 21:
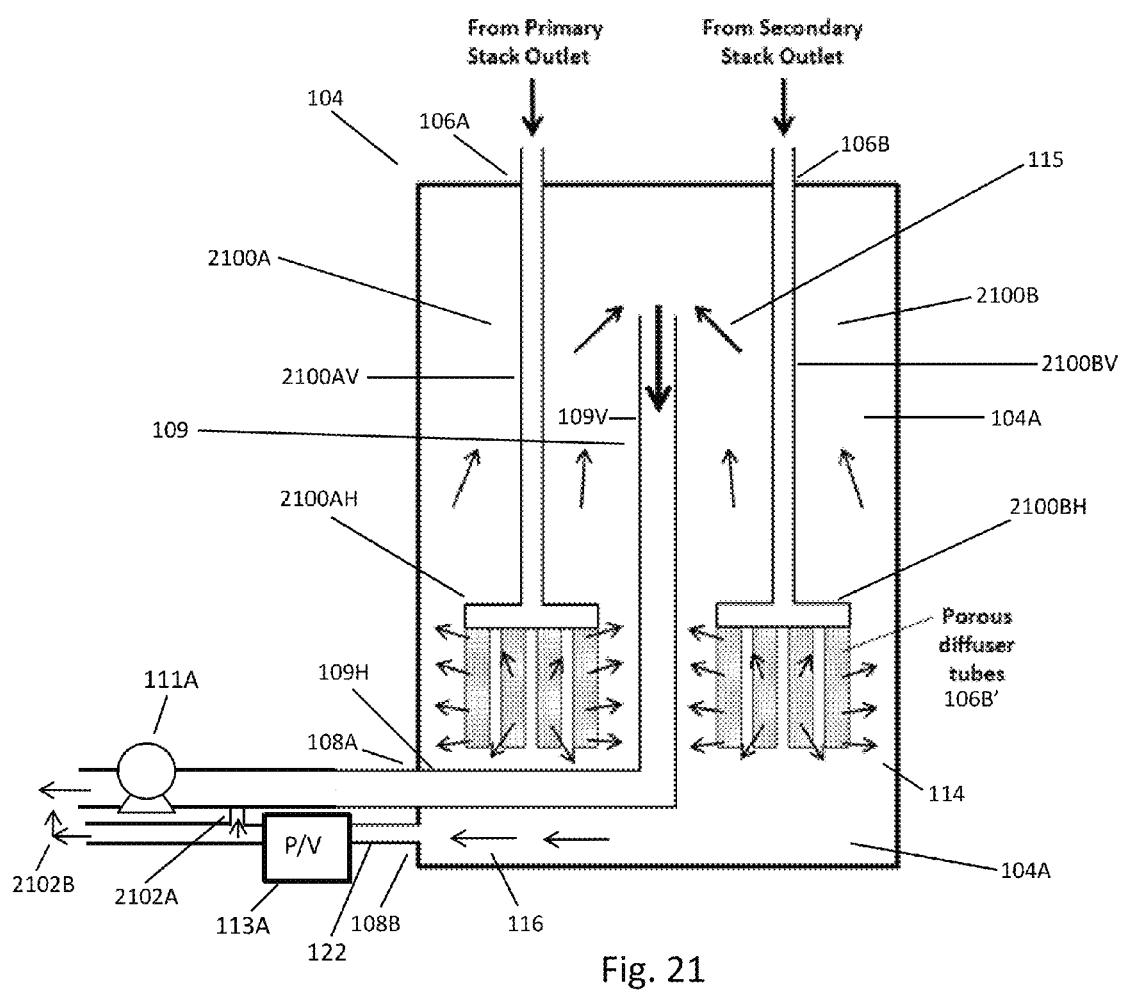

FIG. 21 illustrates another embodiment. In this embodiment, both the primary inlet 106A and the secondary inlet 106B are located in a top wall of the reservoir 104. In contrast to the above described embodiments, the primary outlet 108A and the secondary outlet 108B are located in a sidewall of the reservoir 104 rather than in the bottom wall of the reservoir 104. This may be facilitated, for example, with the use of an "L" shaped conduit 109 in the reservoir 104. Metal-halide electrolyte 114 flows down a vertical portion 109V of the conduit 109, typically located in a middle portion of the reservoir 104 and then to a horizontal portion 109H of the conduit 109 which is connected to the primary outlet 108A located on a sidewall of the reservoir 104.

Similarly to the embodiments discussed above, in charge mode, a first pump 111A may be used in a single flow loop, e.g. single flow loop 120-124-126, to pump metal-halide electrolyte solution 115 from the reservoir middle portion 104B to the stack 101 and then from the stack back to the reservoir 104. In this embodiment, a second pump or valve 113A in conduit 122 connected to the secondary outlet 108B may be closed or turned off to minimize providing the complexed halogen phase from reaching the stack 101 in charge mode. In discharge mode, the second pump or valve 113A is opened or turned on and the first pump 111A is turned on in a single flow loop 120-122-124-126 to pump the liquid metal-halide electrolyte solution 115 and the complexed halogen phase 116 from the reservoir to the stack 101 and back to the reservoir 104.

In an embodiment, the metal-halide electrolyte solution 115 from the primary outlet 108A and the complexed halogen phase 116 from the secondary electrolyte outlet 108B may be combined to form an enriched complexed halogen phase electrolyte mixture after being pumped out of the reservoir 104. In an embodiment, the metal-halide electrolyte solution 115 from the primary outlet 108A and the complexed halogen phase 116 from the electrolyte outlet 108B are combined at junction 2102A prior to reaching (e.g. upstream of) the first pump 111A. Alternatively, the metal-halide electrolyte solution 115 from the primary outlet 108A and the complexed halogen phase 116 from the secondary outlet 108B may be combined after (e.g. downstream of) the pump 111A at junction 2102B, especially if device 113A is a device.

The present embodiment also includes diffusers, as in some of the embodiments above. The diffusers in this embodiment are porous conduits (e.g. tubes or pipes) 106B' to diffuse the inlet stream inside the lower portion 104A of the reservoir 104. In this embodiment, a plurality of porous pipes 106B' are attached to primary inlet conduit 2100A and secondary inlet conduit 2100B which are connected to the primary inlet 106A and the secondary inlet 106B, respectively. In an embodiment, the primary inlet conduit 2100A includes a vertical portion 2100AV connected to the primary inlet 106A and a horizontal portion 2100AH to which a plurality of porous pipes 106B' are attached. The horizontal portion 2100AH of the primary inlet conduit 2100A may have plate shape or a plurality of horizontal pipes. In this manner, multiple rows having a plurality of porous pipes 106B' may be provided to better diffuse the inlet stream inside the lower portion 104A of the reservoir 104. Similarly to the primary inlet conduit 2100A, the secondary inlet conduit 2100B includes a vertical portion 2100BV connected to the secondary inlet 106B and a horizontal portion 2100BH to which a plurality of porous pipes 106B' are attached. The horizontal portion 2100BH of the secondary inlet conduit 2100B may have plate shape or a plurality of horizontal pipes.

Figure 22:
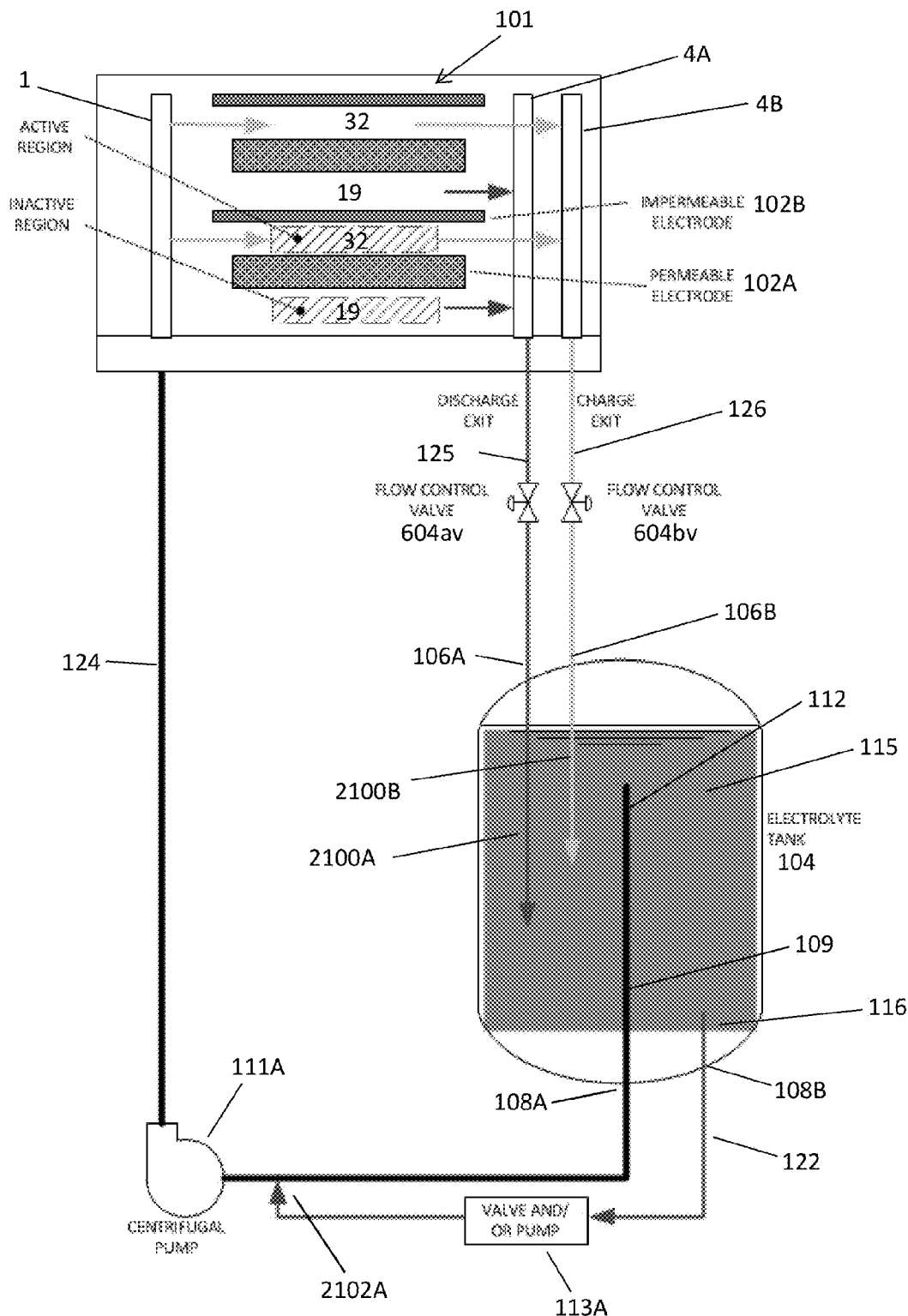

FIG. 22 schematically illustrates another alternative embodiment. Similar to the embodiment illustrated in FIG. 1D, the inlet to the flow battery stack 101 is provided by conduit 124 through which electrolyte may flow from the reservoir 104 to the manifold 1. In this embodiment, the permeable electrode 102A is located below the impermeable electrode 102B in each cell. The secondary outlet 108B at the bottom of the reservoir 104 is connected to a conduit 122. An outlet of the conduit 122 is connected to an inlet of a second pump and/or valve 113A. An inlet of the inlet opening 112 of conduit 109 is located in the middle portion of the reservoir 104, where the lighter metal-halide electrolyte (e.g., aqueous zinc bromide) is located. In the embodiment illustrated in FIG. 22, the conduit 109 exits through the primary outlet 108A a bottom wall of the reservoir 104. However, the conduit 109 may be configured to exit through a side wall of the reservoir 104 as illustrated in FIG. 21. The conduit 109 is connected to an inlet of the pump 111A. In charge mode, pump or valve 113A is closed/shut off such no concentrated halogen reactant flows into the stack 101 via conduit 122 during charge mode. In discharge mode, pump and/or valve 113A is open (e.g., the pump is turned on) to allow the concentrated halogen reactant to flow into the stack 101 via conduit 122. Similar to the previous embodiment, the metal-halide electrolyte solution 115 from the primary outlet 108A and the complexed halogen phase 116 from the secondary outlet 108B may be combined at junction 2102A prior to reaching (e.g. upstream of) the first pump 111A. Alternatively, the metal-halide electrolyte solution 115 from the primary outlet 108A and the complexed halogen phase 116 from the secondary outlet 108B may be combined after (e.g. downstream of) the pump 111A.

Additionally, similar to the embodiment illustrated in FIG. 1D, conduits 125 and 126 separately provide exit flow streams from the respective primary outlet manifold 4A and secondary outlet manifold 4B of the stack 101 to the reservoir 104. In this embodiment, however, conduits 125 and 126 may be configured with variable flow control valves 604av, 604bv, in order to control the flow ratios of the exit flow streams being provided into the reservoir 104 through respective inlets 106A, 106B into the respective conduits 2100A, 2100B. Conduits 2100A, 2100B may terminate with the diffusers described above with respect to FIG. 21.

Thus, in the embodiment of FIG. 22 there is one common inlet conduit 124 and inlet manifold 1 for providing the flow into the reaction zone 32 of each cell in the stack 101 in both charge and discharge modes. The variable valves 604av and/or 604bv may be configured to force the majority of fluid flow (e.g., >50%, such as 60-90%, for example 80%) from reaction zone 32 through the porous electrode 102A and region 19 to manifold 4A and conduit 125 into inlet 106A in both the charge and discharge modes, while forcing a minority of the fluid flow (e.g., <50%, such as 10-40%, for example 20%) to exit from reaction zone 32 through manifold 4B and conduit 126 into inlet 106B without flowing through the porous electrode 102A. Alternatively, the variable valves 604av and/or 604bv may be configured to force the minority of fluid flow (e.g. <50%, such as 10-40%, for example 20%) from reaction zone 32 through the porous electrode 102A and flow channel 19 to manifold 4A, conduit 125 and inlet 106A in both the charge and discharge modes, while forcing a majority of the fluid flow (e.g., >50%, such as 60-90%, for example 80%) to exit from reaction zone 32 through manifold 4B, conduit 126 and inlet 106B without flowing through the porous electrode 102A.

Figure 23:
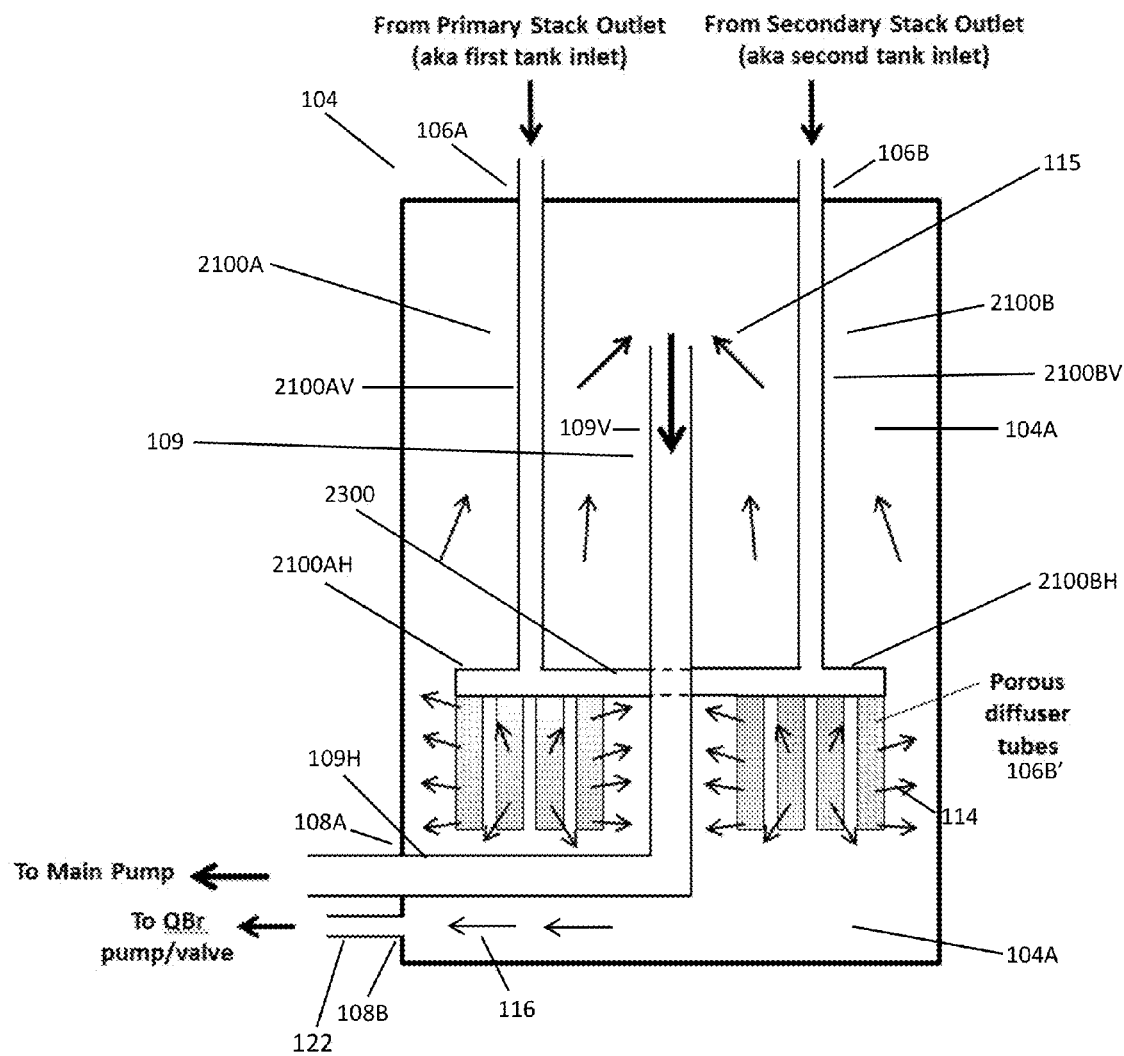

FIG. 23 illustrates another alternative embodiment. The embodiment illustrated in FIG. 23 is similar to the embodiment illustrated in FIG. 21. However, the embodiment of FIG. 23 includes at least one conduit 2300 that fluidly connects the first and second inlets 106A, 106B. Conduit(s) 2300 may extend in any one or more suitable directions in the reservoir. For example, conduit 2300 may be a horizontal conduit which connects the horizontal portions 2100AH, 2100BH of the primary and secondary inlet conduits 2100A, 2100B. Optionally, multiple conduits 2300 may be provided to connecting the horizontal portions 2100AH, 2100BH of the primary and secondary inlet conduits 2100A, 2100B. The additional horizontal conduit(s) 2300 allows the flow of the mixture 114 of liquid metal-halide electrolyte solution 115 and complex halogen phase 116 from the primary inlet 106A to distribute into the porous pipes 106B' of the secondary inlet 106B in cases where the primary inlet flow rate is greater than the secondary inlet flow rate (and vice versa). This helps maintain a relatively uniform flow distribution across the surfaces of the porous pipes 106A', 106B' and correspondingly uniform velocity as flow exits the porous pipes 106A', 106B' and enters the bulk volume of the reservoir 104.

The present embodiment may be combined with the embodiment illustrated in FIG. 22 in which either of the primary or secondary inlets 106A, 106B can serve as the higher flow inlet depending on the state of the flow control valves 604av, 604bv. Preferably, the flow is not forced to combine prior to exiting the porous pipes 106A', 106B' although the primary and secondary inlets 106A, 106B are connected in this embodiment. The path of lowest fluidic resistance from the primary inlet 106A is still through the first set of porous pipes 106A' (and likewise for the secondary inlet 106B and porous pipes 106B'). As a result, any phase separation that may have taken place between or within the two fluid streams will be relatively well preserved.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A flow battery reservoir, comprising:
a reservoir housing;
an electrolyte inlet located in an upper portion of the reservoir and configured to provide an electrolyte mixture comprising a liquid metal-halide electrolyte solution and a complexed halogen phase at or toward a stagnant zone in a lower portion of the reservoir;
an electrolyte outlet configured to outlet the liquid metal-halide electrolyte solution from the reservoir, wherein the electrolyte outlet is positioned such that in use the liquid metal-halide solution flows upward against the force of gravity to reach the electrolyte outlet while the complexed halogen phase settles in the stagnant zone;
a secondary electrolyte inlet located in an upper portion of the reservoir;
a first diffuser fluidly connected to the electrolyte inlet of the reservoir; and
a second diffuser fluidly connected to the secondary electrolyte inlet of the reservoir.

2. The reservoir of claim 1, further comprising an outlet conduit that extends from the electrolyte outlet in the lower portion of the reservoir through the lower portion of the reservoir into a middle portion of the reservoir, wherein an inlet of the outlet conduit is located in the middle portion of the reservoir.

3. The reservoir of claim 2, wherein in use the liquid metal-halide solution flows upward against the force of gravity into the inlet of the outlet conduit using suction from a pump while the complexed halogen phase settles in the stagnant zone.

4. The reservoir of claim 1, further comprising a secondary electrolyte outlet located in the stagnant zone in the lower portion of the reservoir, the secondary electrolyte outlet configured to remove complexed halogen phase from the stagnant zone.

5. The reservoir of claim 1, wherein the first diffuser comprises a first porous pipe comprising a non-horizontal segment connected to a first non-vertical extension segment, and wherein the second diffuser comprises a second porous pipe comprising a non-horizontal segment connected to a second non-vertical extension segment.

6. The reservoir of claim 5, further comprising at least one conduit connecting the first non-vertical extension segment and the second non-vertical extension segment.

7. The reservoir of claim 1, further comprising an outlet conduit that extends from the electrolyte outlet in the lower portion of the reservoir through the lower portion of the reservoir into a middle portion of the reservoir, wherein an inlet of the outlet conduit is located in the middle portion of the reservoir and an outlet of the outlet conduit is located in a sidewall of the reservoir.

8. The reservoir of claim 1, wherein the first diffuser comprises a plurality of first porous conduits and the second diffuser comprises a plurality of second porous conduits.

9. The reservoir of claim 8, wherein the plurality of first porous conduits comprise a plurality of first vertically oriented conduits which are fluidly connected to one or more first horizontally oriented conduits which are fluidly connected to a first vertically oriented conduit which is connected to the electrolyte inlet in a top of the reservoir and the plurality of second porous conduits comprise a plurality of second vertically oriented conduits which are fluidly connected to one or more second horizontally oriented conduits which are fluidly connected to a second vertically oriented conduit which is connected to the secondary electrolyte inlet in a top of the reservoir.

10. A flow battery system, comprising:
the reservoir of claim 1;
a stack of flow battery cells;
a first stack outlet comprising complexed halogen phase poor electrolyte outlet in the stack;
a second stack outlet comprising complexed halogen phase rich electrolyte outlet in the stack;
a first outlet conduit fluidly connecting the first stack outlet to the electrolyte inlet of the reservoir; and
a second outlet conduit fluidly connecting the second stack outlet to the secondary electrolyte inlet of the reservoir.

11. The system of claim 10, further comprising:
a first pump;
a second pump or valve;
a second electrolyte outlet located in the stagnant zone in the lower portion of the reservoir; and
a single loop flow circuit between the stack and the reservoir.

12. The system of claim 11, wherein:
a reaction zone between positive and negative electrodes of each flow battery cell in the stack lacks a separator, such that the electrolyte mixture circulates through the single flow loop circuit without a separation between the positive and negative electrodes in each flow battery cell;
the second pump or valve is connected to the second electrolyte outlet; and
the electrolyte outlet is configured to outlet the liquid metal-halide electrolyte solution; and
the second electrolyte outlet is configured to outlet the complexed halogen phase.

13. A method of operating a flow battery, comprising:
providing an electrolyte mixture comprising a liquid metal-halide electrolyte solution and a complexed halogen phase from a flow battery stack at or toward a stagnant zone in a lower portion of a reservoir;
providing the liquid metal-halide solution from the reservoir to the flow battery stack such that the liquid metal-halide solution flows upward against the force of gravity in the reservoir while the complexed halogen phase settles in the stagnant zone;
using a pump in a single flow loop to pump the liquid metal-halide electrolyte solution from the reservoir to the flow battery stack during a charge mode, and to pump the liquid metal-halide electrolyte solution and the complexed halogen phase from the reservoir to the flow battery stack during a discharge mode;
closing a valve or stopping a second pump, to minimize providing of the complexed halogen phase to the flow battery stack during the charge mode; and
opening the valve or operating the second pump, to provide the complexed halogen phase to the flow battery stack during the discharge mode.

14. The method of claim 13, wherein the electrolyte mixture is provided from above the lower portion of the reservoir toward the stagnant zone.

15. The method of claim 13, further comprising providing the electrolyte mixture from the middle portion of the reservoir through an outlet conduit into an electrolyte outlet located in the lower portion of the reservoir.

16. The method of claim 15, further comprising removing the complexed halogen phase from the stagnant zone through a secondary electrolyte outlet located in the stagnant zone in the lower portion of the reservoir.

17. The method of claim 16, further comprising:
combining electrolyte mixture from the outlet conduit and complexed halogen phase from the secondary electrolyte outlet to form an enriched complexed halogen phase electrolyte mixture after removal from the reservoir; and
providing the enriched complexed halogen phase electrolyte mixture to the flow battery stack.

18. The method of claim 17, wherein the enriched complexed halogen phase electrolyte mixture is provided to the flow battery stack with the pump and the enriched complexed halogen phase is formed outside of the reservoir prior to being provided to the pump.

19. The method of claim 16, further comprising providing the electrolyte mixture to the stagnant zone through a secondary electrolyte inlet.

20. The method of claim 13, further comprising removing a portion of a gas from an upper portion of the reservoir through a gas outlet.

21. The method of claim 13, wherein the liquid metal-halide electrolyte solution flows upward against the force of gravity into the inlet of an outlet conduit located above the stagnant zone and then flows through the conduit and out of the reservoir through an outlet located in the stagnant zone using suction from the pump, while the complexed halogen phase settles in the stagnant zone.

22. The method of claim 13, further comprising:
splitting the electrolyte mixture in the flow battery stack into a first portion having a first concentration of complexed halogen phase and a second portion having a second concentration of complexed halogen phase, wherein the first concentration is smaller than the second concentration; and
providing both the first and second portions of the electrolyte mixture to the lower portion of the reservoir.

23. The method of claim 22, wherein the first portion of the electrolyte mixture is provided through a first diffuser into the lower portion of the reservoir and the second portion of the electrolyte is provided through a second diffuser into the lower portion of the reservoir.

24. The method of claim 23, wherein:
the first portion of the electrolyte mixture passes through a reaction zone between a negative, impermeable electrode and a positive, permeable electrode in the stack and then through a first stack outlet into a first inlet on top of the reservoir; and
the second portion of the electrolyte mixture passes through the positive, permeable electrode to a flow channel below the positive, permeable electrode and then through a second stack outlet into a second inlet on top of the reservoir.

* * * * *